United States Patent
Bae et al.

(10) Patent No.: US 10,462,200 B2
(45) Date of Patent: *Oct. 29, 2019

(54) SYSTEM FOR CLOUD STREAMING SERVICE, METHOD FOR STILL IMAGE-BASED CLOUD STREAMING SERVICE AND APPARATUS THEREFOR

(71) Applicant: SK PLANET CO., LTD., Seongnam-si, Gyeonggi-Do (KR)

(72) Inventors: Tae-Meon Bae, Seoul (KR); Hong-seo Yun, Incheon (KR); Hyun-Sik Na, Bucheon-si (KR); Dong-Gook Kim, Suwon-si (KR); Yoo-Ri Jung, Daejeon (KR); Dong-Su Lee, Seongnam-si (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,307

(22) Filed: Jan. 26, 2017

(65) Prior Publication Data
US 2017/0134454 A1 May 11, 2017

Related U.S. Application Data

(63) Continuation of application No. PCT/KR2015/006952, filed on Jul. 6, 2015.

(30) Foreign Application Priority Data

Jul. 30, 2014 (KR) .......................... 10-2014-0097322
Aug. 25, 2014 (KR) .......................... 10-2014-0110551
(Continued)

(51) Int. Cl.
*H04L 29/06* (2006.01)
*H04N 21/234* (2011.01)
(Continued)

(52) U.S. Cl.
CPC ...... *H04L 65/4069* (2013.01); *H04L 65/4084* (2013.01); *H04L 65/602* (2013.01);
(Continued)

(58) Field of Classification Search
USPC ......... 709/231; 345/501, 541; 382/166, 209, 382/239
See application file for complete search history.

(56) References Cited

U.S. PATENT DOCUMENTS 5,983,251 A * 11/1999 Martens ............... H04N 19/186
375/E7.083
6,075,559 A * 6/2000 Harada ..................... G06T 9/00
348/148

(Continued)

FOREIGN PATENT DOCUMENTS

CN 101883281 A 11/2010
GB 2486475 * 6/2012 ............... H04N 7/50
(Continued)

OTHER PUBLICATIONS

RFC-2083 PNG (Portable Network Graphics) Specification Version 1.0; T.Boutell et. al. Mar. 1997 (Year: 1997).*
(Continued)

*Primary Examiner* — Ranodhi Serrao
*Assistant Examiner* — James N Fiorillo
(74) *Attorney, Agent, or Firm* — Fenwick & West LLP

(57) ABSTRACT

The present invention relates to a system for a cloud streaming service, a method for a still image-based cloud streaming service and an apparatus therefor. The still image-based cloud streaming service can be provided by capturing the changed area in the changed frame by comparing same with the previous frame, selecting a still-image compression technique by considering any one or more from among the size of the changed area and image characteristics, and
(Continued)

transmitting, to a user, the changed area encoded by the still-image compression technique. When providing a still image-based cloud streaming service, by utilizing still-image compression techniques which are appropriate to the conditions, the compression efficiency of the still image and speed of the cloud streaming service can be improved.

13 Claims, 10 Drawing Sheets

(30) Foreign Application Priority Data

| | | |
|---|---|---|
| Oct. 16, 2014 | (KR) | 10-2014-0139556 |
| Nov. 11, 2014 | (KR) | 10-2014-0156004 |

(51) Int. Cl.

| | |
|---|---|
| H04N 21/236 | (2011.01) |
| H04N 19/12 | (2014.01) |
| H04N 19/137 | (2014.01) |
| H04N 19/146 | (2014.01) |
| H04N 19/17 | (2014.01) |
| H04N 21/2343 | (2011.01) |
| H04N 21/81 | (2011.01) |

(52) U.S. Cl.
CPC ............ *H04L 65/607* (2013.01); *H04L 65/80* (2013.01); *H04N 19/12* (2014.11); *H04N 19/137* (2014.11); *H04N 19/146* (2014.11); *H04N 19/17* (2014.11); *H04N 21/234* (2013.01); *H04N 21/236* (2013.01); *H04N 21/234345* (2013.01); *H04N 21/8153* (2013.01)

(56) References Cited

U.S. PATENT DOCUMENTS

| | | | | |
|---|---|---|---|---|
| 6,167,155 | A * | 12/2000 | Kostrzewski | G06T 9/001 348/699 |
| 7,016,547 | B1 * | 3/2006 | Smirnov | H03M 7/40 375/E7.144 |
| 7,433,521 | B2 | 10/2008 | Chen et al. | |
| 7,769,083 | B2 | 8/2010 | Maeda et al. | |
| 7,813,570 | B2 | 10/2010 | Shen et al. | |
| 7,949,053 | B2 | 5/2011 | Makai et al. | |
| 8,213,730 | B2 | 7/2012 | Kawazoe et al. | |
| 8,948,530 | B2 * | 2/2015 | Wee | G06T 9/00 382/166 |
| 2003/0031371 | A1 * | 2/2003 | Kato | G06T 9/00 382/239 |
| 2003/0110299 | A1 * | 6/2003 | Larsson | H04N 1/00244 709/247 |
| 2004/0001638 | A1 * | 1/2004 | Mehrotra | H04N 19/46 382/244 |
| 2005/0123042 | A1 * | 6/2005 | Park | H04N 21/234309 375/240.12 |
| 2005/0210145 | A1 * | 9/2005 | Kim | H04N 21/4786 709/231 |
| 2006/0013495 | A1 * | 1/2006 | Duan | G06K 9/38 382/235 |
| 2007/0014369 | A1 * | 1/2007 | Santhoff | H04B 1/7163 375/240.27 |
| 2009/0189890 | A1 * | 7/2009 | Corbett | G06F 9/505 345/419 |
| 2010/0290704 | A1 * | 11/2010 | Christiansen | G06T 9/00 382/173 |
| 2011/0001849 | A1 * | 1/2011 | Wada | H04N 5/2353 348/241 |
| 2011/0242112 | A1 * | 10/2011 | Katayama | G09G 5/36 345/501 |
| 2012/0128256 | A1 * | 5/2012 | Mishima | G06T 7/254 382/209 |
| 2013/0155075 | A1 * | 6/2013 | Matsui | G06T 9/001 345/501 |
| 2013/0163812 | A1 | 6/2013 | Mukasa | |
| 2013/0176431 | A1 * | 7/2013 | Ogawa | H04N 19/593 348/143 |
| 2014/0015842 | A1 * | 1/2014 | Sebesta | G06F 3/1431 345/541 |
| 2014/0212033 | A1 * | 7/2014 | Liang | H04N 1/642 382/166 |
| 2014/0241629 | A1 * | 8/2014 | Lerios | G06T 9/00 382/166 |
| 2014/0270557 | A1 * | 9/2014 | Ignatchenko | G06F 3/1454 382/239 |
| 2015/0117545 | A1 * | 4/2015 | Fu | H04N 19/30 375/240.18 |
| 2018/0097988 | A1 * | 4/2018 | Tsuchiya | G03B 7/091 |

FOREIGN PATENT DOCUMENTS

| | | |
|---|---|---|
| GB | 2486475 A | 6/2012 |
| JP | 2005-033762 A | 2/2005 |
| JP | 2005-287035 A | 10/2005 |
| JP | 2006-094494 A | 4/2006 |
| JP | 2006-519533 A | 8/2006 |
| JP | 2008-040529 A | 2/2008 |
| JP | 2010-004434 A | 1/2010 |
| JP | 2010-055280 A | 3/2010 |
| JP | 2010-119030 A | 5/2010 |
| JP | 2013-126185 A | 6/2013 |
| JP | 2013-131990 A | 7/2013 |
| KR | 1020130011714 A | 1/2013 |
| KR | 10312268 B1 | 9/2013 |
| KR | 1020140027040 A | 3/2014 |
| KR | 1020140034603 A | 3/2014 |
| KR | 1020140035707 A | 3/2014 |
| KR | 1020140076668 A | 6/2014 |
| KR | 1020140093849 A | 7/2014 |

OTHER PUBLICATIONS

Yang M, Bourbakis N. An overview of lossless digital image compression techniques. InCircuits and systems, 2005. 48th Midwest symposium on Aug. 7, 2005 (pp. 1099-1102). IEEE. (Year: 2005).*

Yeo BL, Liu B. Rapid scene analysis on compressed video. IEEE Transactions on circuits and systems for video technology. Dec. 1995;5(6):533-44. (Year: 1995).*

Sullivan GJ, Wiegand T. Rate-distortion optimization for video compression. IEEE signal processing magazine. Nov. 1, 1998;15(6): 74-90. (Year: 1998).*

International Search Report for application No. PCT/KR2015/006952 dated Oct. 20, 2015, citing the above reference.

A partial supplementary European search report dated Feb. 28, 2018 in connection with the counterpart European Patent Application No. 15827254.2, citing the above reference(s).

* cited by examiner

SYSTEM FOR CLOUD STREAMING SERVICE, METHOD FOR STILL IMAGE-BASED CLOUD STREAMING SERVICE AND APPARATUS THEREFOR

CROSS-REFERENCE TO RELATED APPLICATION

The present application is a continuation of International Patent Application No. PCT/KR2015/006952, filed on Jul. 6, 2015, which is based upon and claims the benefit of priority to Korean Patent Application Nos. 10-2014-0097322, filed on Jul. 30, 2014, 10-2014-0110551, filed on Aug. 25, 2014, 10-2014-0139556, filed on Oct. 16, 2014, 10-2014-0156004, filed on Nov. 11, 2014. The disclosure of the above-listed applications is hereby incorporated by reference herein in its entirety

TECHNICAL FIELD

The present invention relates to a cloud streaming service system, a cloud streaming service method based on a still image, and a related apparatus. More particularly, this invention relates to a cloud streaming service system, method and apparatus for improving compression efficiency and a service speed in a cloud streaming service by capturing a changed region contained in a changed frame in comparison with a previous frame, selecting a still image compression technique, based on at least one of a size of the changed region, an image type of the changed region, a load size of a cloud streaming server, and a data processing rate of a network, and encoding the changed region by using the selected still image compression technique.

BACKGROUND

A cloud streaming service basically applies a cloud streaming technique based on a video codec. Therefore, in case of a menu display or the like, the cloud streaming service is inefficient because of unnecessarily capturing the entire screen and encoding with the video codec.

Namely, as to a screen in which static images are slightly changed in response to a user input, an image-based cloud streaming service may be more efficient than a cloud streaming service using the video codec.

In other words, when a cloud streaming service based on a still image is performed, it is more efficient to detect a region changed between frames and then transmit such a minimum region only.

However, in case of applying a still image codec, the amount of data may be considerably varied depending on the type of an image to be compressed. Also, the efficiency of a cloud streaming service may be significantly varied depending on the still image compression technique used for compression. Therefore, a new technique for quickly and exactly identifying an image type and then adaptively applying an image cloud is required.

Additionally, for performing a cloud streaming service based on a still image, it is very important to exactly detect a region at which a change between frames occurs. Therefore, a technique for detecting such a changed region more simply and more effectively is also required.

Further, as cable or IPTV providers have been supplying various kinds of set-top boxes for a long time, there are wide differences in performance between such set-top boxes. In fact, more than 15 types of set-top boxes have been introduced in recent 10 years. The difference in performance between a good set-top box and a bad set-top box is so large that a content provider may not be able to provide contents to a user in a desired manner.

Besides, in case of a cloud streaming service based on a still image, web application developers who write a code for a web application want to write the code in the same way they used to be, whereas a cloud streaming server wants a code, to which no animation is applied, containing only information about an image requiring to be captured and information corresponding to the properties of animation. Namely, in order to provide a code desired by a CS server, web application developers need to write the code in a new way, rather than the way they used to be.

Relevant techniques are disclosed in Korean Patent Publication Nos. 10-2014-0076668 (Title: Method for providing game based on cloud streaming, system, client terminal and service apparatus), published on Jun. 23, 2013, and 10-2014-0027040 (Title: Adaptive predictive image compression system and method thereof), published on Mar. 6, 2014.

SUMMARY

An object of the present invention is to improve compression efficiency and a service speed in a cloud streaming service by using a suitable still image compression technique for context when a cloud streaming service based on a still image is provided.

Additionally, an object of the present invention is to improve compression efficiency and a service speed in a cloud streaming service by using a suitable still image compression technique for an image type when a cloud streaming service based on a still image is provided.

Additionally, an object of the present invention is to prevent a service delay, which may be caused by a load of a cloud streaming server, and to quickly provide a service by using a suitable still image compression technique for the status of the cloud streaming server when a cloud streaming service based on a still image is provided.

Additionally, an object of the present invention is to provide a faster cloud streaming service to more users over the same band by maximizing the efficiency of streaming compression through a cloud streaming service based on a still image.

Additionally, an object of the present invention is to provide a cloud streaming service method in which a cloud streaming server detects a change between frames in a menu screen, etc. having a smaller frame change, and then compresses such a changed region only by using a still image codec.

In order to accomplish the above objects, a cloud streaming server according to the present invention comprises a capture unit configured to capture a changed region contained in a changed frame in comparison with a previous frame; an encoding unit configured to select a still image compression technique by considering one or more of a size of the changed region and an image type corresponding to the changed region, and to perform a still image encoding of the changed region corresponding to one frame by using the selected still image compression technique; and a sending unit configured to perform a cloud streaming service based on a still image by sending the still-image-encoded changed region to a user.

In the cloud streaming server, the encoding unit may be further configured to compress the changed region by using one of still image compression techniques including PNG (portable network graphics), palleted PNG (portable network graphics), and JPEG (joint photography experts group).

In the cloud streaming server, the encoding unit may be further configured, if the size of the changed region is smaller than a predetermined reference value, to encode the changed region by applying the PNG still image compression technique.

In the cloud streaming server, the encoding unit may be further configured, if the size of the changed region is equal to or greater than the reference value, to select the still image compression technique by considering the image type.

In the cloud streaming server, the encoding unit may be further configured, if the image type is a natural image, to encode the changed region by applying the JPEG still image compression technique.

In the cloud streaming server, the encoding unit may be further configured, if the size of the changed region is equal to or greater than a predetermined reference value, and if the image type is a synthetic image, to encode the changed region by applying the palette PNG still image compression technique.

In the cloud streaming server, the encoding unit may be further configured, if the image type is a mixed image of the natural image and the synthetic image, to select the still image compression technique in accordance with the image type corresponding to a larger part in the changed region by comparing a part corresponding to the natural image with another part corresponding to the synthetic image.

In the cloud streaming server, the capture unit may be further configured to capture, as the changed region, a specific region changed in a screen area corresponding to the changed frame in comparison with a screen area corresponding to the previous frame.

In the cloud streaming server, the capture unit may be further configured to detect a section having a smaller frame change in all frames to be transmitted to a terminal device of the user, and to capture the changed region in the detected section.

In the cloud streaming server, the capture unit may be further configured to detect the section having a smaller frame change by sensing an event type of an application occurring at the terminal device of the user.

Additionally, a cloud streaming service method based on a still image according to the present invention comprises steps of capturing a changed region contained in a changed frame in comparison with a previous frame; selecting a still image compression technique by considering one or more of a size of the changed region and an image type corresponding to the changed region, and performing a still image encoding of the changed region corresponding to one frame by using the selected still image compression technique; and performing a cloud streaming service based on a still image by sending the still-image-encoded changed region to a user.

In the method, the encoding step may include compressing the changed region by using one of still image compression techniques including PNG (portable network graphics), palleted PNG (portable network graphics), and PEG (joint photography experts group).

In the method, the encoding step may include, if the size of the changed region is smaller than a predetermined reference value, encoding the changed region by applying the PNG still image compression technique.

In the method, the encoding step may include, if the size of the changed region is equal to or greater than the reference value, selecting the still image compression technique by considering the image type.

In the method, the encoding step may include, if the image type is a natural image, encoding the changed region by applying the MEG still image compression technique.

In the method, the encoding step may include, if the size of the changed region is equal to or greater than a predetermined reference value, and if the image type is a synthetic image, encoding the changed region by applying the palette PNG still image compression technique.

In the method, the encoding step may include, if the image type is a mixed image of the natural image and the synthetic image, selecting the still image compression technique in accordance with the image type corresponding to a larger part in the changed region by comparing a part corresponding to the natural image with another part corresponding to the synthetic image.

In the method, the capturing step may include capturing, as the changed region, a specific region changed in a screen area corresponding to the changed frame in comparison with a screen area corresponding to the previous frame.

In the method, the capturing step may include detecting a section having a smaller frame change in all frames to be transmitted to a terminal device of the user, and capturing the changed region in the detected section.

In the method, the capturing step may include detecting the section having a smaller frame change by sensing an event type of an application occurring at the terminal device of the user.

Additionally, a cloud streaming service system according to the present invention comprises a cloud streaming server configured to capture a changed region contained in a changed frame in comparison with a previous frame, to select a still image compression technique by considering one or more of a size of the changed region and an image type corresponding to the changed region, to perform a still image encoding of the changed region corresponding to one frame by using the selected still image compression technique, and to perform a cloud streaming service based on a still image by sending the still-image-encoded changed region to a user; and a terminal configured to receive, from the cloud streaming server, an application execution result screen corresponding to the cloud streaming service.

Additionally, a cloud streaming server according to another embodiment of the present invention comprises a capture unit configured to capture a changed region contained in a changed frame in comparison with a previous frame; an encoding unit configured to select a still image compression technique in accordance with an image type determined by considering one or more of the number of colors of an image corresponding to the changed region and a standard deviation of pixel values of the image, and to perform a still image encoding of the changed region corresponding to one frame by using the selected still image compression technique; and a sending unit configured to perform a cloud streaming service based on a still image by sending the still-image-encoded changed region to a user.

In the cloud streaming server, the encoding unit may be further configured to select the still image compression technique in accordance with one of image types including a natural image and a synthetic image.

In the cloud streaming server, the encoding unit may be further configured, if the number of colors of the image corresponding to the changed region is greater than a predetermined reference number, to determine the image type as the natural image.

In the cloud streaming server, the encoding unit may be further configured, if the number of colors of the image corresponding to the changed region is equal to or smaller than the predetermined reference number, to determine the image type by considering the standard deviation of the pixel values of the image corresponding to the changed region.

In the cloud streaming server, the encoding unit may be further configured, if the number of colors of the image corresponding to the changed region is equal to or smaller than the predetermined reference number, and if the standard deviation of the pixel values of the image corresponding to the changed region is equal to or smaller than a predetermined reference value, to determine the image type as the synthetic image.

In the cloud streaming server, the encoding unit may be further configured, if the standard deviation of the pixel values of the image corresponding to the changed region is greater than a predetermined reference value, to determine the image type as the natural image.

In the cloud streaming server, the encoding unit may be further configured to encode the changed region by using a still image compression technique selected from PNG (portable network graphics) and JPEG (joint photography experts group) in accordance with the image type.

In the cloud streaming server, the capture unit may be further configured to capture, as the changed region, a specific region changed in a screen area corresponding to the changed frame in comparison with a screen area corresponding to the previous frame.

In the cloud streaming server, the capture unit may be further configured to detect a section having a smaller frame change in all frames to be transmitted to a terminal device of the user, and to capture the changed region in the detected section.

in the cloud streaming server, the capture unit may be further configured to detect the section having a smaller frame change by sensing an event type of an application occurring at the terminal device of the user.

Additionally, a cloud streaming service method based on an image type according to the present invention comprises steps of capturing a changed region contained in a changed frame in comparison with a previous frame; selecting a still image compression technique in accordance with an image type determined by considering one or more of the number of colors of an image corresponding to the changed region and a standard deviation of pixel values of the image, and performing a still image encoding of the changed region corresponding to one frame by using the selected still image compression technique; and performing a cloud streaming service based on a still image by sending the still-image-encoded changed region to a user.

In the method, the encoding step may include selecting the still image compression technique in accordance with one of image types including a natural image and a synthetic image.

In the method, the encoding step may include, if the number of colors of the image corresponding to the changed region is greater than a predetermined reference number, determining the image type as the natural image.

In the method, the encoding step may include, if the number of colors of the image corresponding to the changed region is equal to or smaller than the predetermined reference number, determining the image type by considering the standard deviation of the pixel values of the image corresponding to the changed region.

In the method, the encoding step may include, if the number of colors of the image corresponding to the changed region is equal to or smaller than the predetermined reference number, and if the standard deviation of the pixel values of the image corresponding to the changed region is equal to or smaller than a predetermined reference value, determining the image type as the synthetic image.

In the method, the encoding step may include, if the standard deviation of the pixel values of the image corresponding to the changed region is greater than a predetermined reference value, determining the image type as the natural image.

In the method, the encoding step may include encoding the changed region by using a still image compression technique selected from PNG (portable network graphics) and PEG (joint photography experts group) in accordance with the image type.

In the method, the capturing step may include capturing, as the changed region, a specific region changed in a screen area corresponding to the changed frame in comparison with a screen area corresponding to the previous frame.

Additionally, a cloud streaming service system according to another embodiment of the present invention comprises a cloud streaming server configured to capture a changed region contained in a changed frame in comparison with a previous frame, to select a still image compression technique in accordance with an image type determined by considering one or more of the number of colors of an image corresponding to the changed region and a standard deviation of pixel values of the image, to perform a still image encoding of the changed region corresponding to one frame by using the selected still image compression technique, and to perform a cloud streaming service based on a still image by sending the still-image-encoded changed region to a user; and a terminal configured to receive, from the cloud streaming server, an application execution result screen corresponding to the cloud streaming service.

Additionally, a cloud streaming server according to yet another embodiment of the present invention comprises a capture unit configured to capture a changed region contained in a changed frame in comparison with a previous frame; an encoding unit configured to select a still image compression technique by considering one or more of a load size of the cloud streaming server and a data processing rate of a network, and to perform a still image encoding of the changed region corresponding to one frame by using the selected still image compression technique; and a sending unit configured to perform a cloud streaming service based on a still image by sending the still-image-encoded changed region to a user.

In the cloud streaming server, the encoding unit may be further configured to compress the changed region by using one of still image compression techniques including PNG (portable network graphics), palleted PNG (portable network graphics), and JPEG (joint photography experts group).

In the cloud streaming server, the encoding unit may be further configured, if the load size of the cloud streaming server is smaller than a predetermined reference value, to encode the changed region by applying the MEG still image compression technique.

In the cloud streaming server, the encoding unit may be further configured, if the load size of the cloud streaming server is equal to or greater than the predetermined reference value, to select the still image compression technique by considering the data processing rate of the network.

In the cloud streaming server, the encoding unit may be further configured to encode the changed region by applying the PNG still image compression technique if the data processing rate of the network is smaller than a predetermined processing rate.

In the cloud streaming server, the encoding unit may be further configured to encode the changed region by applying the palette PNG still image compression technique if the load size of the cloud streaming server is equal to or greater than a predetermined reference value and if the data processing rate is equal to or greater than the predetermined processing rate.

In the cloud streaming server, the capture unit may be further configured to capture, as the changed region, a specific region changed in a screen area corresponding to the changed frame in comparison with a screen area corresponding to the previous frame.

in the cloud streaming server, the capture unit may be further configured to detect a section having a smaller frame change in all frames to be transmitted to a terminal device of the user, and to capture the changed region in the detected section.

In the cloud streaming server, the capture unit may be further configured to detect the section having a smaller frame change by sensing an event type of an application occurring at the terminal device of the user.

Additionally, a cloud streaming service method based on a still image according to yet another embodiment of the present invention comprises steps of capturing a changed region contained in a changed frame in comparison with a previous frame; selecting a still image compression technique by considering one or more of a load size of the cloud streaming server and a data processing rate of a network, and performing a still image encoding of the changed region corresponding to one frame by using the selected still image compression technique; and performing a cloud streaming service based on a still image by sending the still-image-encoded changed region to a user.

In the method, the encoding step may include compressing the changed region by using one of still image compression techniques including PNG (portable network graphics), palleted PNG (portable network graphics), and JPEG (joint photography experts group).

In the method, the encoding step may include, if the load size of the cloud streaming server is smaller than a predetermined reference value, encoding the changed region by applying the JPEG still image compression technique.

In the method, the encoding step may include, if the load size of the cloud streaming server is equal to or greater than the predetermined reference value, selecting the still image compression technique by considering the data processing rate of the network.

In the method, the encoding step may include encoding the changed region by applying the PNG still image compression technique if the data processing rate of the network is smaller than a predetermined processing rate.

In the method, the encoding step may include encoding the changed region by applying the palette PNG still image compression technique if the load size of the cloud streaming server is equal to or greater than a predetermined reference value and if the data processing rate is equal to or greater than the predetermined processing rate.

In the method, the capturing step may include captureing, as the changed region, a specific region changed in a screen area corresponding to the changed frame in comparison with a screen area corresponding to the previous frame.

In the method, the capturing step may include detecting a section having a smaller frame change in all frames to be transmitted to a terminal device of the user, and to capture the changed region in the detected section.

In the method, the capturing step may include detecting the section having a smaller frame change by sensing an event type of an application occurring at the terminal device of the user.

Additionally, a cloud streaming service system according to yet another embodiment of the present invention comprises a cloud streaming server configured to capture a changed region contained in a changed frame in comparison with a previous frame, to select a still image compression technique by considering one or more of a load size of the cloud streaming server and a data processing rate of a network, to perform a still image encoding of the changed region corresponding to one frame by using the selected still image compression technique, and to perform a cloud streaming service based on a still image by sending the still-image-encoded changed region to a user; and a terminal configured to receive, from the cloud streaming server, an application execution result screen corresponding to the cloud streaming service.

Further, in order to solve the above objects, the present invention provides a computer program, recorded on a medium, for executing the above-discussed method.

According to the present invention, it is possible to exactly and quickly detect a changed screen region between frames in an image-based cloud streaming service. Therefore, by compressing and transmitting the minimum region only, a high-quality image-based cloud streaming service can be improved in efficiency and provided more economically.

Additionally, the present invention may improve the efficiency of a cloud streaming service by maximizing the compression efficiency of image-based streaming. Particularly, it is possible to provide a faster image-based cloud streaming service to more users over the same band.

Additionally, since a changed screen region between frames can be exactly and quickly detected in an image-based cloud streaming service, the present invention can improve the efficiency of the image-based cloud streaming service and also provide a high-quality cloud streaming service more economically.

Additionally, the present invention may improve the efficiency of a cloud streaming service by exactly determining an image type, applying a suitable compression technique for the image type, and maximizing the compression efficiency. Particularly, it is possible to provide a faster image-based cloud streaming service to more users over the same band.

Additionally the present invention may improve the compression efficiency of an image and the service speed of a cloud streaming service by using a suitable still image compression technique for context when a cloud streaming service based on a still image is provided.

Additionally, the present invention may prevent a service delay, which may be caused by a load of a cloud streaming server, and may also quickly provide a service by using a suitable still image compression technique for the status of the cloud streaming server when a cloud streaming service based on a still image is provided.

Additionally, the present invention may provide a faster image-based cloud streaming service to more users over the same band by maximizing the streaming compression efficiency through a cloud streaming service based on a still image.

DETAILED DESCRIPTION

Figure 1:
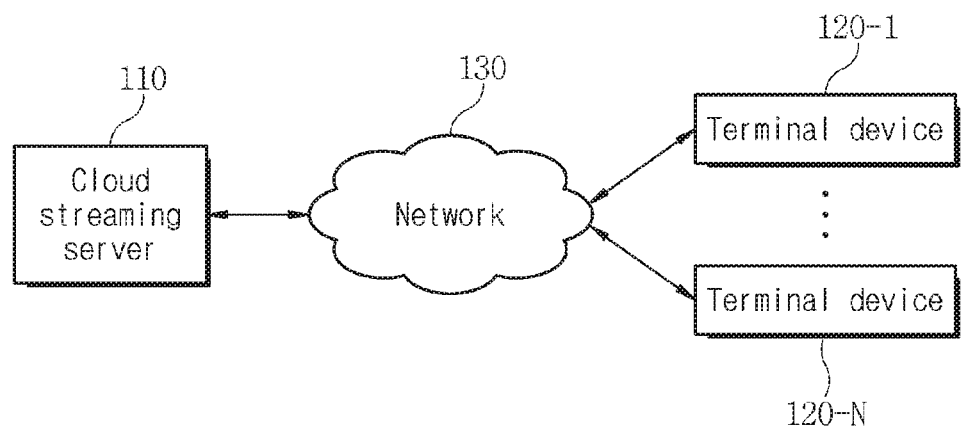
FIG. 1 is a block diagram illustrating a cloud streaming service system according to an embodiment of the present invention.

Now the present invention will be described in detail with reference to the accompanying drawings. Herein, well known functions and elements may not be described in detail to avoid obscuring the subject matter of this invention. Embodiments of this invention are provided for helping those skilled in the art to completely understand the invention. In the drawings, some elements may be exaggerated in shape and size for a clear illustration.

Hereinafter, preferred embodiments of this invention will be described with reference to the accompanying drawings.

FIG. 1 is a block diagram illustrating a cloud streaming service system according to an embodiment of the present invention.

Referring to FIG. 1, the cloud streaming service system according to an embodiment of this invention includes a cloud streaming server 110, terminal devices 120-1 to 120-N, and a network 130.

The cloud streaming server 110 executes an application in response to a request for a cloud streaming service from the terminal devices 120-1 to 120-N and provides an execution resultant screen corresponding to a result of executing the application to the terminal devices 120-1 to 120-N.

The cloud streaming service basically applies a cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming service system in which the cloud streaming server detects a changed region between frames in case of a smaller change between frames, such as a menu display screen, and encodes the changed region only through the still image compression technique.

The cloud streaming server 110 captures a changed region contained in a changed frame in comparison with a previous frame. Namely, compared with a screen corresponding to the previous frame, a different region in a screen corresponding to the changed frame may be captured as the changed region. In this case, the server may detect a section having a smaller frame change in all frames to be transmitted to the terminal devices 120-1 to 120-N and then capture the changed region in the detected section. At this time, by identifying an event type of an application occurring at the terminal devices 120-1 to 120-N, such a section having a smaller frame change may be detected.

Also, the cloud streaming server 110 selects a still image compression technique by considering one or more of the size of a changed region and an image type corresponding to a changed region, and performs a still image encoding of the changed region corresponding to one frame by using the selected still image compression technique. In this case, using the still image compression technique such as PNG (portable network graphics), paletted PNG (portable network graphics) and JPEG (joint photography experts group), the changed region may be compressed. If the size of the changed region is smaller than a predetermined reference value, the PNG still image compression technique may be applied to encode the changed region, If the size of the changed region is equal to or greater than the predetermined reference value, a suitable still image compression technique may be selected by considering the image type. If the image type is a natural image, the JPEG still image compression technique may be applied to encode the changed region. If the size of the changed region is equal to or greater than the predetermined reference value, and if the image type is a synthetic image, the paletted PNG still image compression technique may be applied to encode the changed region. If the image type is a mixed image of the natural image and the synthetic image, a suitable still image compression technique may be selected depending on the image type corresponding to a larger part in the changed region by comparing a part corresponding to the natural image with another part corresponding to the synthetic image.

Also, the cloud streaming server 110 transmits the still-image-encoded changed region to a user, thus performing the cloud streaming service based on a still image.

The terminal devices 120-1 to 120-N receive an application execution result screen corresponding to the cloud streaming service from the cloud streaming server 110 and then provide it to a user.

The terminal devices 120-1 to 120-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 120-1 to 120-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 130 offers a route of delivering data between the cloud streaming server 110 and the terminal devices 120-1 to 120-N, including a typically used network and any future developable network. For example, the network 130 may be a wired/wireless short-range communication network for providing communication of various information devices within a limited area, a mobile communication network for providing communication between mobile entities and between a mobile entity and any other entity outside the mobile entity; a satellite communications network for providing communication between earth stations using satellites, one of wired/wireless communication networks, or any combination thereof. Meanwhile, the standard of transmission scheme for the network 130 is not limited to the existing transmission scheme standard, and may include all transmission scheme standards to be developed in the future. Also, the network used between the cloud streaming server 110 and the terminal devices 120-1 to 120-N in FIG. 1 may be different from or identical with a network between the terminal devices 120-1 to 120-N.

Figure 2:
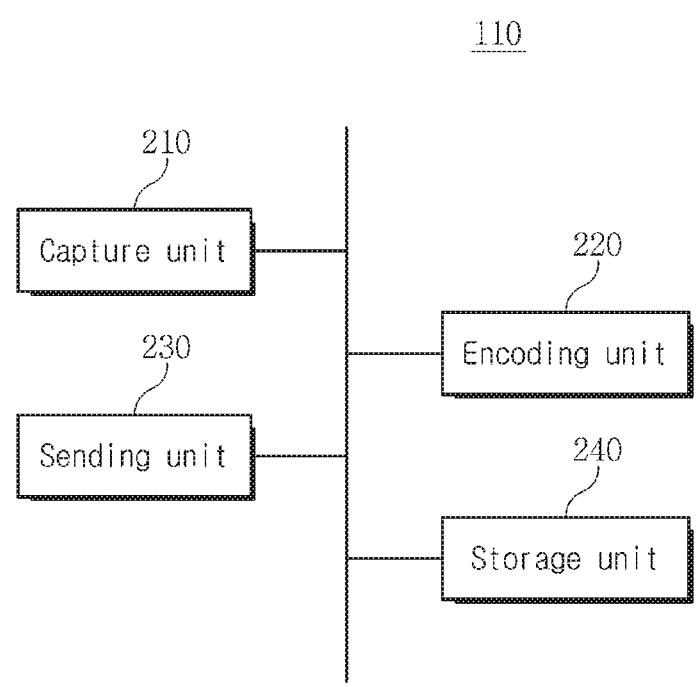
FIG. 2 is a block diagram illustrating an example of the cloud streaming server shown in FIG. 1.

FIG. 2 is a block diagram illustrating an example of the cloud streaming server shown in FIG. 1.

Referring to FIG. 2, the cloud streaming server 110 shown in FIG. 1 includes a capture unit 210, an encoding unit 220, a sending unit 230, and a storage unit 240.

The cloud streaming service basically applies cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming server 110 for detecting a changed region between frames in case of a smaller change between frames, such as a menu display screen, and encoding the changed region only through the still image compression technique.

The capture unit 210 captures a changed region contained in a changed frame in comparison with a previous frame. The cloud streaming technique based on the video codec may capture and encode all frames corresponding to a screen on which an application is running. However, if there is a smaller change between frames on the screen, the capture unit 210 may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 220 selects a still image compression technique by considering one or more of the size of the changed region and the image type corresponding to the changed region, and then performs a still image encoding of the changed region corresponding to one frame by using the selected still image compression technique. For example, the captured region may have various sizes from a very small size to a large size corresponding to the entire frame, depending on a region changed in a frame. Also, the image type of the captured region may be a natural image such as a photo or a picture, or a synthetic image made by mixture of several images. Also, the natural image and the synthetic image may simultaneously exist in the captured changed region.

In this case, using the still image compression technique such as PNG (portable network graphics), paletted PNG (portable network graphics), and PEG (joint photography experts group), the changed region may be compressed. The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The JPEG still image compression technique has a good compression efficiency and thus can considerably reduce the amount of transmission data when encoding but may cause a great system load because of a high compression efficiency when encoding and decoding.

If the size of the changed region is smaller than a predetermined reference value, the encoding unit may encode the changed region by applying the PNG still image compression technique. For example, if the changed region has a smaller size in comparison with the predetermined reference value, the encoding unit may encode the changed region by applying the PNG still image compression technique that allows relatively high-quality encoding because of a smaller image size and a small amount of data to be transmitted. The predetermined reference value may be set by a server manager in view of the processing performance of the cloud streaming server 110, the transmission speed of a network, and the load of a server system.

If the size of the changed region is equal to or greater than the reference value, the encoding unit may select the still image compression technique by considering an image type. When the amount of data to be transmitted is great because the size of the changed region is equal to or greater than the reference value, the encoding unit may perform encoding by using the JPEG still image compression technique having a high compression efficiency or the paletted PNG still image compression technique capable of reducing the size of data.

If the image type is a natural image, the encoding unit may encode the changed region by using the JPEG still image compression technique. The JPEG still image compression technique may be more effective in compressing a natural image in which similar colors gather around one pixel. Therefore, if the size of the changed region is equal to or greater than the reference value and if the image type corresponding to the changed region is a natural image, the encoding unit may encode the changed region by using the JPEG still image compression technique.

If the size of the changed region is equal to or greater than the predetermined reference value and if the image type is a synthetic image, the encoding unit may encode the changed region by using the paletted PNG still image compression technique. The JPEG still image compression technique having a high compression efficiency may be used because the size of the changed region is great, However, as to a synthetic image, the JPEG still image compression technique may not reach the expectation. Therefore, in this case, the encoding unit may encode the changed region by using the paletted PNG still image capable of reducing the size of data.

If the image type is a mixed image of a natural image and a synthetic image, the encoding unit may select the still image compression technique in accordance with the image type corresponding to a larger part in the changed region by comparing a part corresponding to the natural image with another part corresponding to the synthetic image. For example, if a part corresponding to the natural image is greater than another part corresponding to the synthetic image in the changed region, the encoding unit may encode the changed region by using the JPEG still image. Otherwise, if a part corresponding to the synthetic image is greater than another part corresponding to the natural image in the changed region, the encoding unit may encode the changed region by using the paletted PNG still image compression technique.

Additionally, the order of considering the size of the changed region and the image type corresponding to the changed region so as to determine the still image compression technique for encoding the changed region may be determined differently depending on the cloud streaming service.

The sending unit 230 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 240 stores various kinds of the above-discussed information created in a cloud streaming service process according to an embodiment of this invention.

According to an embodiment, the storage unit 240 may be formed independently from the cloud streaming service 110 and support a function for the cloud streaming service. In this case, the storage unit 240 may operate as separate high-capacity storage and include a control function for the operation.

In addition, the above-discussed cloud streaming server 110 may be also implemented by means of one or more servers.

Meanwhile, the cloud streaming server 110 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 3:
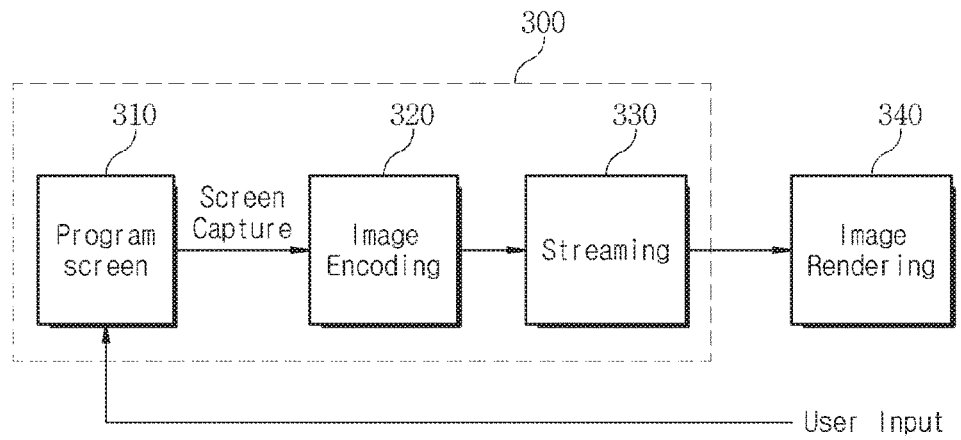
FIG. 3 is a diagram illustrating a cloud streaming system based on a still image according to an embodiment of the present invention.

FIG. 3 is a diagram illustrating a cloud streaming system based on a still image according to an embodiment of the present invention.

Referring to FIG. 3, a server 300 may execute a program screen 310 in response to a user input received from the user's terminal device and perform a screen capture. In this case, the server 300 may be a cloud streaming server or a web application server. A process of executing the program screen 310 and performing a screen capture may correspond to an operation flow of the capture unit 210 shown in FIG. 2.

The server 300 may perform an image encoding 320 of the captured program screen 310 through a still image compression technique. In this case, a process of performing the image encoding 320 may correspond to an operation flow of the encoding unit 220 shown in FIG. 2.

At this time, the server may capture only a changed region by comparing a changed frame with a previous frame. Also, the server may select one of still image compression techniques such as. PNG (portable network graphics), paletted PNG (portable network graphics) and JPEG (joint photography experts group) by considering the size of the changed region and the image type corresponding to the changed region, and encode the changed region through the selected still image compression technique.

Thereafter, the server 300 may perform streaming 330 of the still-image-encoded changed region to the user's terminal device, thus providing a cloud streaming service based on a still image. In this case, a process of performing the streaming 330 may correspond to an operation flow of the sending unit 230 shown in FIG. 2.

Thereafter, the user's terminal device performs rendering 340 of received data and thereby display the program screen 310 to the user as if the program screen executed in an application in response to a user input is executed at the user's terminal device.

Figure 4:
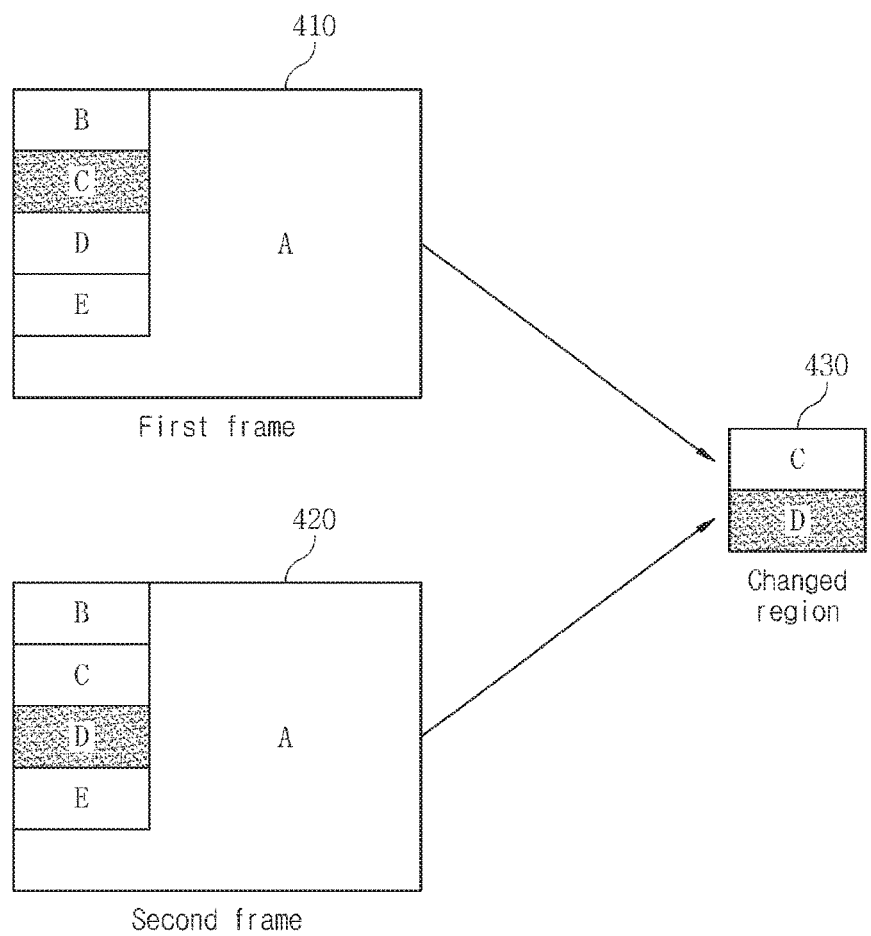
FIG. 4 is a diagram illustrating a process of capturing a changed region in a cloud streaming service based on a still image according to an embodiment of the present invention.

FIG. 4 is a diagram illustrating a process of capturing a changed region in a cloud streaming service based on a still image according to an embodiment of the present invention.

Referring to FIG. 4, the cloud streaming service based on a still image according to an embodiment of this invention may compare the first frame 410 with the second frame 420 and then capture and encode a changed region 430 only.

For example, let's suppose that regions B, C, D and E in the first and second frames 410 and 420 are menu displays. In the first frame 410, a curser is located at the region C, so that the region C may be highlighted to be distinguished from the other regions B, D and E. In the second frame 420, the curser is moved from the region C to the region D, so that the region D may be highlighted to be distinguished from the other regions B, C and E.

In this case, as the result of comparison between the first and second frames 410 and 420, the regions C and D only may be captured as the changed region 430. The server may also select a still image compression technique by considering the size of the changed regions 430 and the image type of the changed regions 430, and then encode the changed regions 430 by using the selected still image compression technique.

A typical cloud streaming service may perform encoding by capturing all frames, corresponding to a frame rate, including the first and second frames 410 and 420 which are certainly changed. However, the cloud streaming service based on a still image captures only the changed regions 430 and encodes it through the still image compression technique, thus improving the efficiency of a service in comparison with the typical cloud streaming service that unnecessarily captures many frames and the entire screen of such a frame.

Figure 5:
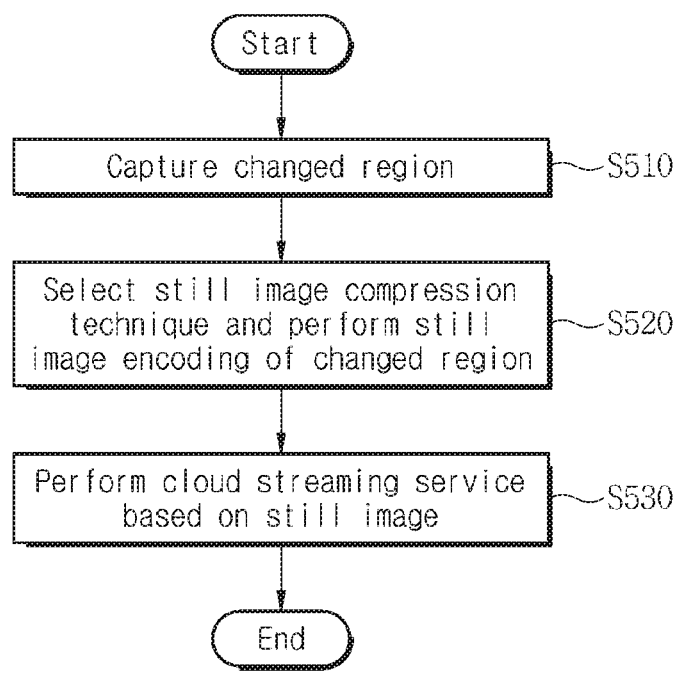
FIG. 5 is a flow diagram illustrating a cloud streaming service method based on a still image according to an embodiment of the present invention.

FIG. 5 is a flow diagram illustrating a cloud streaming service method based on a still image according to an embodiment of the present invention.

Referring to FIG. 5, the cloud streaming service method based on a still image according to an embodiment of this invention captures a changed region contained in a changed frame in comparison with a previous frame (S510). A cloud streaming technique based on a video codec may performing encoding by capturing all frames corresponding to a screen on which an application is running. However, when a change between frames is small on the screen where the application is running, it is possible to perform a still image encoding by capturing only a changed region of a changed frame in comparison with a previous frame such that a user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally, the cloud streaming service method based on a still image according to an embodiment of this invention selects a still image compression technique by considering one or more of the size of the changed region and the image type corresponding to the changed region, and then perform a still image encoding of the changed region corresponding to one frame (S520). For example, the captured region may have various sizes from a very small size to a large size corresponding to the entire frame, depending on a region changed in a frame. Also, the image type of the captured region may be a natural image such as a photo or a picture, or a synthetic image made by mixture of several images. Also, the natural image and the synthetic image may simultaneously exist in the captured changed region.

In this case, using the still image compression technique such as PNG (portable network graphics), paletted PNG (portable network graphics), and JPEG (joint photography experts group), the changed region may be compressed. The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The JPEG still image compression technique has a good compression efficiency and thus can considerably reduce the amount of transmission data when encoding but may cause a great system load because of a high compression efficiency when encoding and decoding.

If the size of the changed region is smaller than a predetermined reference value, the encoding unit may encode the changed region by applying the PNG still image compression technique. For example, if the changed region has a smaller size in comparison with the predetermined reference value, the encoding unit may encode the changed region by applying the PNG still image compression technique that allows relatively high-quality encoding because of a smaller image size and a small amount of data to be transmitted. The predetermined reference value may be set by a server manager in view of the processing performance of the cloud streaming server, the transmission speed of a network, and the load of a server system.

If the size of the changed region is equal to or greater than the reference value, the encoding unit may select the still image compression technique by considering an image type. When the amount of data to be transmitted is great because the size of the changed region is equal to or greater than the reference value, the encoding unit may perform encoding by using the JPEG still image compression technique having a high compression efficiency or the paletted PNG still image compression technique capable of reducing the size of data.

If the image type is a natural image, the encoding unit may encode the changed region by using the JPEG still image compression technique. The JPEG still image compression technique may be more effective in compressing a natural image in which similar colors gather around one pixel. Therefore, if the size of the changed region is equal to or greater than the reference value and if the image type corresponding to the changed region is a natural image, the encoding unit may encode the changed region by using the JPEG still image compression technique.

If the size of the changed region is equal to or greater than the predetermined reference value and if the image type is a synthetic image, the encoding unit may encode the changed region by using the paletted PNG still image compression technique. The JPEG still image compression technique having a high compression efficiency may be used because the size of the changed region is great. However, as to a synthetic image, the JPEG still image compression technique may not reach the expectation. Therefore, in this case, the encoding unit may encode the changed region by using the paletted PNG still image capable of reducing the size of data.

If the image type is a mixed image of a natural image and a synthetic image, the encoding unit may select the still image compression technique in accordance with the image type corresponding to a larger part in the changed region by comparing a part corresponding to the natural image with another part corresponding to the synthetic image. For example, if a part corresponding to the natural image is greater than another part corresponding to the synthetic image in the changed region, the encoding unit may encode the changed region by using the JPEG still image. Otherwise, if a part corresponding to the synthetic image is greater than another part corresponding to the natural image in the changed region, the encoding unit may encode the changed region by using the paletted PNG still image compression technique.

Additionally, the order of considering the size of the changed region and the image type corresponding to the changed region so as to determine the still image compression technique for encoding the changed region may be determined differently depending on the cloud streaming service.

Additionally, the cloud streaming service method based on a still image according to an embodiment of this invention performs a cloud streaming service based on a still image by sending the still-image-encoded changed region to a user (S530). Namely, by transmitting the changed region, compressed through a still image encoding, to a user's terminal device, the user can experience as if an application is being executed at the user's terminal device, FIG. 6 is a detailed flow diagram illustrating a cloud streaming service method based on a still image according to an embodiment of the present invention.

Figure 6:
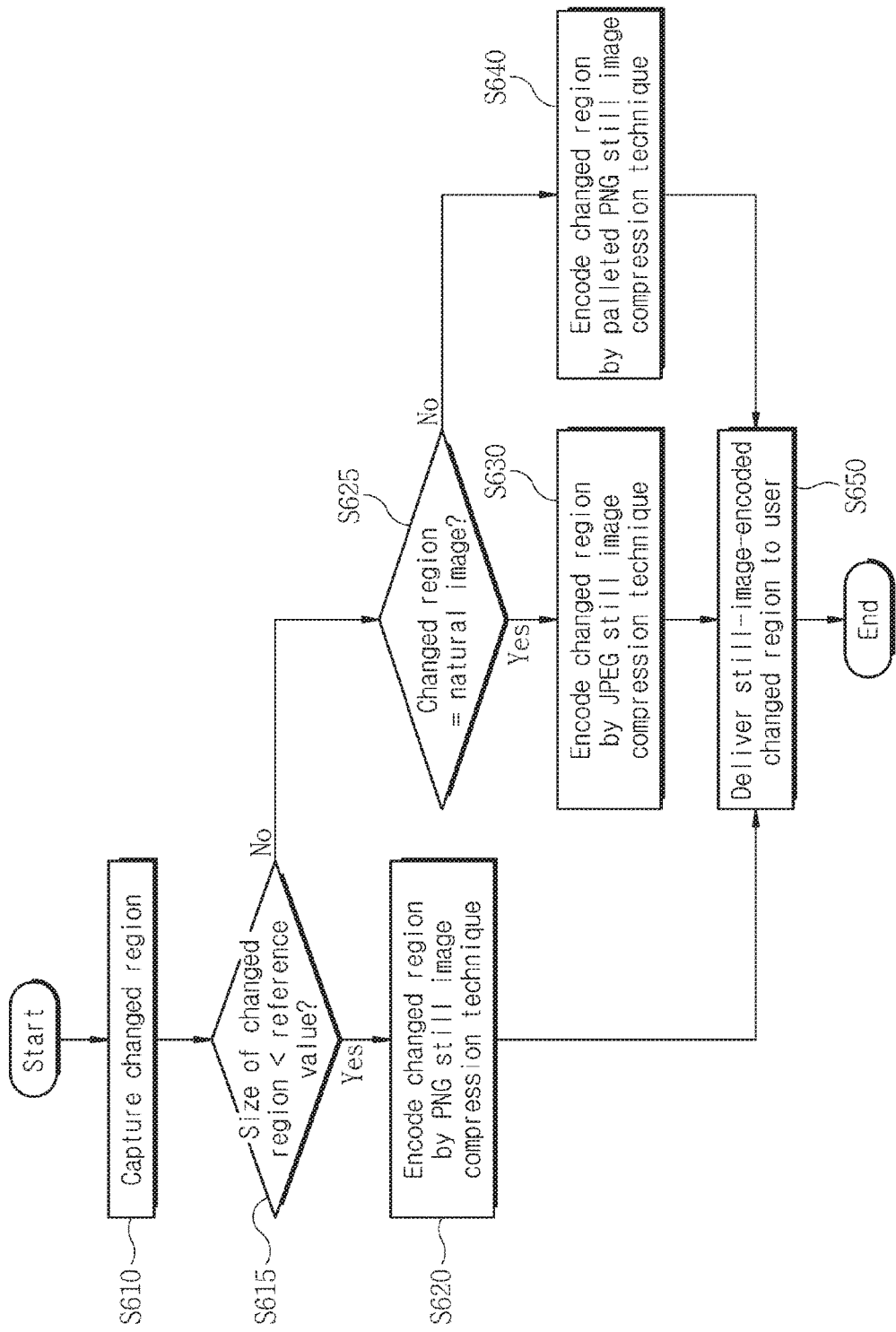
FIG. 6 is a detailed flow diagram illustrating a cloud streaming service method based on a still image according to an embodiment of the present invention.

Referring to FIG. 6, in the cloud streaming service method based on a still image according to an embodiment of this invention, a cloud streaming server captures a changed region contained in a changed frame in comparison with a previous frame (S610). In this case, a certain region of a screen area corresponding to the changed frame that is different from a screen area corresponding to the previous frame may be captured as a changed region. In this case, a section having a smaller frame change may be detected in all frames to be transmitted to the user's terminal device, and the changed region may be captured in the detected section. At this time, by identifying an event type of an application occurring from the user's terminal device, such a section having a smaller frame change may be detected.

The cloud streaming server determines whether the size of the changed region is smaller than a predetermined reference value (S615).

If it is determined at step S615 that the size of the changed region is smaller than the predetermined reference value, the cloud streaming server encodes the changed region through the PNG still image compression technique (S620). The PNG still image compression technique may obtain a good quality of an image but may cause an increase in size of data when encoding. Therefore, if the bandwidth of a transmission network is low, a transmission speed may be lowered. However, because the image size of the changed region is not great and also the amount of data to be transmitted is not great, the server may perform encoding by applying the PNG still image compression technique that allows relatively high-quality encoding.

If it is determined at step S615 that the size of the changed region is equal to or greater than the predetermined reference value, the cloud streaming server determines whether the image type corresponding to the changed region is a natural image (S625).

If it is determined at step S625 that the image type corresponding to the changed region is a natural image, the cloud streaming server encodes the changed region through the JPEG still image compression technique (S630). The PEG still image compression technique has a good compression efficiency and thus can considerably reduce the amount of transmission data when encoding but may cause a great system load because of a high compression efficiency when encoding and decoding. Also, the JPEG still image compression technique may be more effective in compressing a natural image in which similar colors gather around one pixel, rather than in compressing a synthetic image in which several pictures or photos are involved. Therefore, if the size of the changed region is equal to or greater than the reference value and if the image type corresponding to the changed region is a natural image, the server may encode the changed region by using the JPEG still image compression technique.

If it is determined at step S625 that the image type corresponding to the changed region is a synthetic image, the cloud streaming server encodes the changed region through the palleted PNG still image compression technique (S640). Namely if the size of the changed region is equal to or greater than the predetermined reference value and if the image type is a synthetic image, the server may encode the changed region by using the paletted PNG still image capable of reducing the size of data.

Thereafter, the cloud streaming server delivers the still-image-encoded changed region to a user (S650). By transmitting the changed region, compressed through a still image encoding, to a user's terminal device, the user can experience as if an application is being executed at the user's terminal device.

Figure 7:
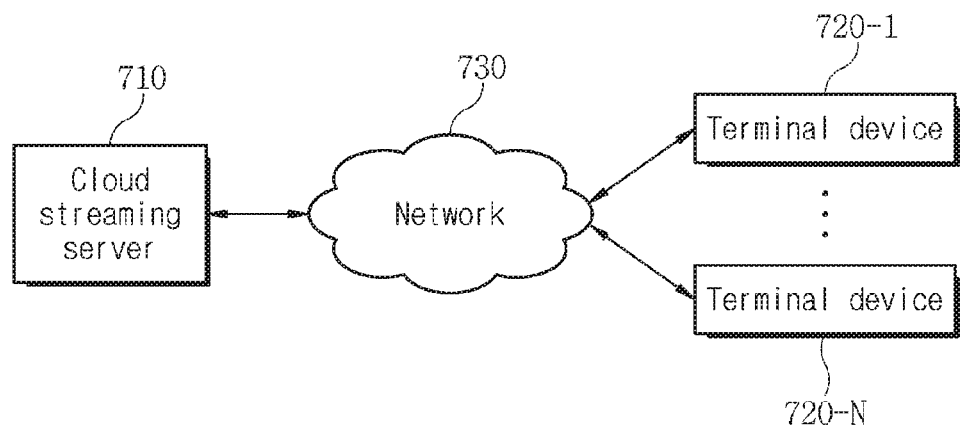
FIG. 7 is a block diagram illustrating a cloud streaming service system according to another embodiment of the present invention.

FIG. 7 is a block diagram illustrating a cloud streaming service system according to another embodiment of the present invention.

Referring to FIG. 7, the cloud streaming service system according to an embodiment of this invention includes a cloud streaming server 710, terminal devices 720-1 to 720-N, and a network 730.

The cloud streaming server 710 executes an application in response to a request for a cloud streaming service from the terminal devices 7204 to 720-N and provides an execution resultant screen corresponding to a result of executing the application to the terminal devices 720-1 to 720-N.

The cloud streaming service basically applies a cloud streaming technique based on a video codec. Therefore, even when the cloud streaming technique is applied to a static screen such as a menu display, the cloud streaming service has been performed in an ineffective trimmer of unnecessarily capturing the entire screen and encoding with the video codec. In order to solve this problem, the present invention provides the cloud streaming service system in which the cloud streaming server detects a changed region between frames in case of a smaller change between frames, such as a menu display screen, and encodes the changed region only through the still image compression technique.

The cloud streaming server 710 captures a changed region contained in a changed frame in comparison with a previous frame. Namely, compared with a screen corresponding to the previous frame, a different region in a screen corresponding to the changed frame may be captured as the changed region. In this case, the server may detect a section having a smaller frame change in all frames to be transmitted to the terminal devices 720-1 to 720-N and then capture the changed region in the detected section. At this time, by identifying an event type of an application occurring at the terminal devices 720-1 to 720-N, such a section having a smaller frame change may be detected.

Additionally, the cloud streaming server 710 selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique. In this case, the server may select the still image compression technique depending on one of image types such as a natural image and a synthetic image. If the number of colors of the image corresponding to the changed region is greater than a predetermined reference number, the server may determine the image type as a natural image, If the number of colors of the image corresponding to the changed region is equal to or smaller than the predetermined reference number, the server may determine the image type by considering the standard deviation of the pixel values of the image corresponding to the changed region. If the number of colors of the image corresponding to the changed region is equal to or smaller than the predetermined reference number, and if the standard deviation of the pixel values of the image corresponding to the changed region is equal to or smaller than a predetermined reference value, the server may determine the image type as a synthetic image. If the standard deviation of the pixel values of the image corresponding to the changed region is greater than the predetermined reference value, the server may determine the image type as a natural image. In this case, the server may perform a still image encoding of the changed region by using a still image compression technique selected from PNG (portable network graphics) and JPEG (joint photography experts group) in accordance with the image type.

Also, the cloud streaming server 710 transmits the still-image-encoded changed region to a user, thus performing the cloud streaming service based on a still image.

The terminal devices 720-1 to 720-N receive an application execution result screen corresponding to the cloud streaming service from the cloud streaming server 710 and then provide it to a user.

The terminal devices 720-1 to 720-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 720-1 to 720-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 730 offers a route of delivering data between the cloud streaming server 710 and the terminal devices 720-1 to 720-N, including a typically used network and any future developable network. For example, the network 730 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 730 is not limited to the existing transmission scheme standard, and may include all transmission scheme standards to be developed in the future. Also, the network used between the cloud streaming server 710 and the terminal devices 720-1 to 720-N in FIG. 7 may be different from or identical with a network between the terminal devices 720-1 to 720-N.

Figure 8:
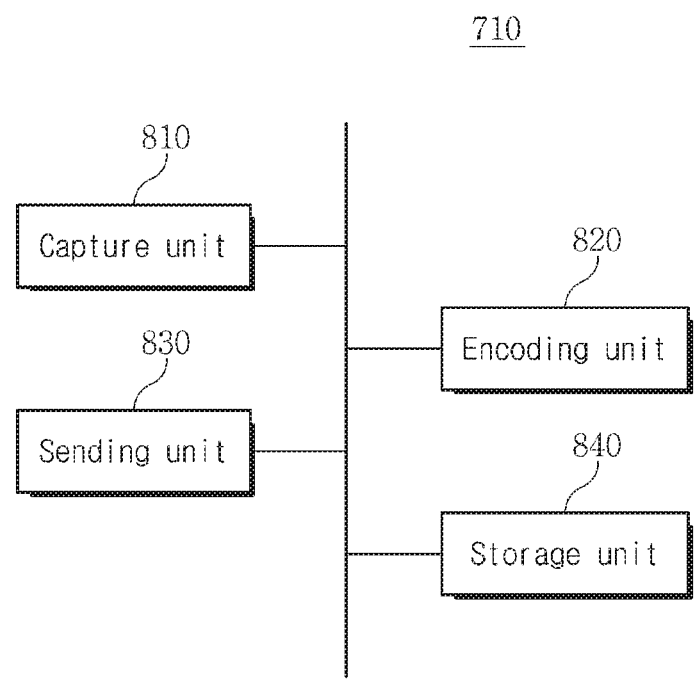
FIG. 8 is a block diagram illustrating an example of the cloud streaming server shown in FIG. 7.

FIG. 8 is a block diagram illustrating an example of the cloud streaming server shown in FIG. 7.

Referring to FIG. 8, the cloud streaming server 710 shown in FIG. 7 includes a capture unit 810, an encoding unit 820, a sending unit 830, and a storage unit 840.

The cloud streaming service basically applies cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming server 710 for detecting a changed region between frames in case of a smaller change between frames, such as a menu display screen, and encoding the changed region only through the still image compression technique.

The capture unit 810 captures a changed region contained in a changed frame in comparison with a previous frame. The cloud streaming technique based on the video codec may capture and encode all frames corresponding to a screen on which an application is running. However, if there is a smaller change between frames on the screen, the capture unit 810 may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 820 selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique. For example, because the image type of the captured changed region may be a single image, such as one photo or one picture, or a mixed image of several images, the encoding unit may determine the image type, select the still image compression technique suitable for each image type, and perform a still image encoding so as to increase the compression efficiency of the changed region.

In this case, the encoding unit may select the still image compression technique depending on one of image types such as a natural image and a synthetic image. The natural image may refer to an image of an object that occurs naturally. For example, the natural image may refer to an optical image, such as one photo or one picture, or an image having other wavelength such as an x-ray and an infrared ray. Contrary to the natural image, the synthetic image may refer to an image created or mixed through a computer or any other artificial means.

If the number of colors of the image corresponding to the changed region is greater than a predetermined reference number, the encoding unit may determine the image type as a natural image. Because the natural image may be an image of an object that occurs naturally, changes in brightness and saturation applied to colors that represent an image may be elaborate in comparison with a synthetic image. Therefore, because the number of colors expressed by pixels constituting a natural image may be varied in comparison with a synthetic image, the image type corresponding to the changed region may be determined by considering the number of colors of an image corresponding to the changed region. For example, if a predetermined reference number is 100,000, the image type may be determined as a natural image when the number of colors that constitute an image corresponding to the changed region is greater than 100,000, and the image type may be determined as a synthetic image when the number of colors is equal to or smaller than 100,000.

If the number of colors of the image corresponding to the changed region is equal to or smaller than the predetermined reference number, the encoding unit may determine the image type by considering the standard deviation of the pixel values of the image corresponding to the changed region. The standard deviation of the pixel values may refer to variations in a distribution of color values expressed by pixels of the image corresponding to the changed region. If the variation denotes zero, this may mean that all colors have the same value. Namely, a smaller standard deviation of pixel values may mean that the image is formed of a smaller number of colors. Therefore, by considering the standard deviation of the pixel values of the image, the image type of the image corresponding to the changed region may be determined.

If the number of colors of the image corresponding to the changed region is equal to or smaller than the predetermined reference number, and if the standard deviation of the pixel values of the image corresponding to the changed region is equal to or smaller than a predetermined reference value, the encoding unit may determine the image type as a synthetic image. For example, let's suppose that the predetermined reference number regarding the number of image colors is 100,000 and also the predetermined reference value regarding the standard deviation of image pixel values is N. In this case, if the number of colors of the image corresponding to the changed region is equal to or smaller than 100,000 and if the standard deviation of color values of the image corresponding to the changed region is equal to or smaller than N, the image type may be determined as a synthetic image.

If the standard deviation of the pixel values of the image corresponding to the changed region is greater than the predetermined reference value, the encoding unit may determine the image type as a natural image. For example, if the standard deviation of the pixel values of an image is greater than the predetermined reference value, this may mean that the image is formed of a greater number of colors. Therefore, if the standard deviation of the pixel values of the image is greater than the predetermined reference value, the encoding unit may determine that the image corresponding to the changed region is a natural image formed of many colors.

In this case, the encoding unit may perform a still image encoding of the changed region by using a still image compression technique selected from PNG (portable network graphics) and JPEG (joint photography experts group) in accordance with the image type.

The PNG still image compression technique may obtain a good quality of an image but may cause an increase in size of data when encoding. Therefore, if the bandwidth of a transmission network is low, a transmission speed may be lowered. The JPEG still image compression technique has a good compression efficiency and thus can considerably reduce the amount of transmission data when encoding but may cause a great system load because of a high compression efficiency when encoding and decoding. Also, the JPEG still image compression technique may be more effective in compressing a natural image in which similar colors gather around one pixel. Therefore, if the image type corresponding to the changed region is a natural image, the encoding unit may encode the changed region through the JPEG still image compression technique.

Additionally, if the changed region is a synthetic image, the JPEG still image compression technique may not reach the expectation of the compression efficiency as much as a natural image. Therefore, in case of a synthetic image, the encoding unit may perform a still image encoding of the changed region by selecting the PNG still image compression technique capable of enhancing the image quality.

Additionally, if the changed region is a synthetic image and has a greater size resulting in great data, the encoding unit may encode the changed region by using the paletted PNG still image compression technique capable of reducing the size of data. The paletted PNG still image compression technique may guarantee a transmission speed because of a reduced data size of an image when encoding but may cause the degradation of an image quality since the color is expressed with 8 bits.

The sending unit 830 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 840 stores various kinds of the above-discussed information created in a cloud streaming service process according to an embodiment of this invention.

According to an embodiment, the storage unit 840 may be formed independently from the cloud streaming service 710 and support a function for the cloud streaming service. In this case, the storage unit 840 may operate as separate high-capacity storage and include a control function for the operation.

In addition, the above-discussed cloud streaming server 710 may be also implemented by means of one or more servers.

Meanwhile, the cloud streaming server 710 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 9:
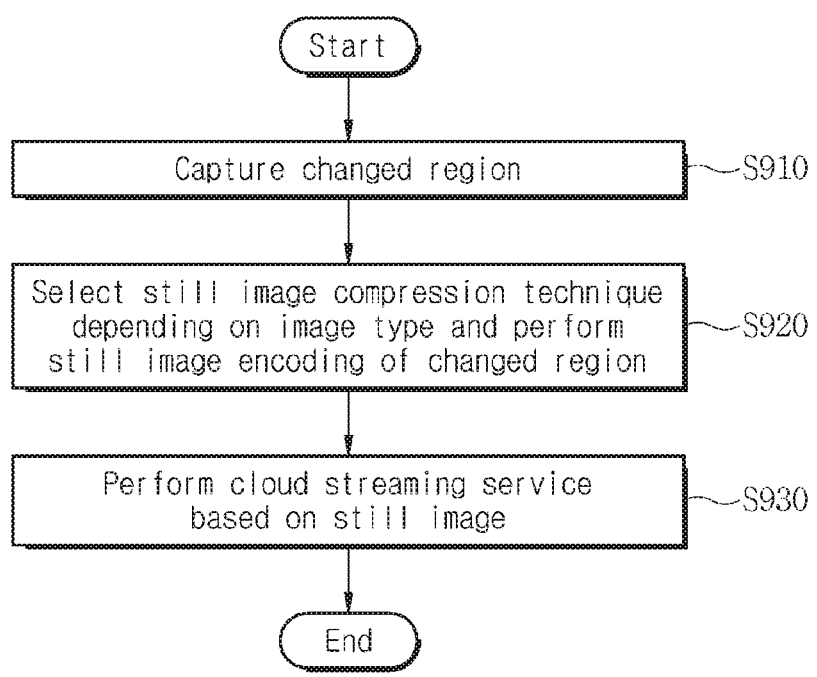
FIG. 9 is a flow diagram illustrating a cloud streaming service method depending on an image type according to an embodiment of the present invention.

FIG. 9 is a flow diagram illustrating a cloud streaming service method depending on an image type according to an embodiment of the present invention.

Referring to FIG. 9, the cloud streaming service method depending on an image type according to an embodiment of this invention captures a changed region contained in a changed frame in comparison with a previous frame (S910). A cloud streaming technique based on a video codec may performing encoding by capturing all frames corresponding to a screen on which an application is running. However, when a change between frames is small on the screen where the application is running, it is possible to perform a still image encoding by capturing only a changed region of a changed frame in comparison with a previous frame such that a user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally the cloud streaming service method depending on an image type according to an embodiment of this invention selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique (S920). For example, because the image type of the captured changed region may be a single image, such as one photo or one picture, or a mixed image of several images, the encoding unit may determine the image type, select the still image compression technique suitable for each image type, and perform a still image encoding so as to increase the compression efficiency of the changed region.

In this case, the encoding unit may select the still image compression technique depending on one of image types such as a natural image and a synthetic image. The natural image may refer to an image of an object that occurs naturally. For example, the natural image may refer to an optical image, such as one photo or one picture, or an image having other wavelength such as an x-ray and an infrared ray. Contrary to the natural image, the synthetic image may refer to an image created or mixed through a computer or any other artificial means.

If the number of colors of the image corresponding to the changed region is greater than a predetermined reference number, the encoding unit may determine the image type as a natural image. Because the natural image may be an image of an object that occurs naturally, changes in brightness and saturation applied to colors that represent an image may be elaborate in comparison with a synthetic image. Therefore, because the number of colors expressed by pixels constituting a natural image may be varied in comparison with a synthetic image, the image type corresponding to the changed region may be determined by considering the number of colors of an image corresponding to the changed region. For example, if a predetermined reference number is 100,000, the image type may be determined as a natural image when the number of colors that constitute an image corresponding to the changed region is greater than 100,000, and the image type may be determined as a synthetic image when the number of colors is equal to or smaller than 100,000.

If the number of colors of the image corresponding to the changed region is equal to or smaller than the predetermined reference number, the encoding unit may determine the image type by considering the standard deviation of the pixel values of the image corresponding to the changed region. The standard deviation of the pixel values may refer to variations in a distribution of color values expressed by pixels of the image corresponding to the changed region. If the variation denotes zero, this may mean that all colors have the same value. Namely, a smaller standard deviation of pixel values may mean that the image is formed of a smaller number of colors. Therefore, by considering the standard deviation of the pixel values of the image, the image type of the image corresponding to the changed region may be determined If the number of colors of the image corresponding to the changed region is equal to or smaller than the predetermined reference number, and if the standard deviation of the pixel values of the image corresponding to the changed region is equal to or smaller than a predetermined reference value, the encoding unit may determine the image type as a synthetic image. For example, let's suppose that the predetermined reference number regarding the number of image colors is 100,000 and also the predetermined reference value regarding the standard deviation of image pixel values is N. In this case, if the number of colors of the image corresponding to the changed region is equal to or smaller than 100,000 and if the standard deviation of color values of the image corresponding to the changed region is equal to or smaller than N, the image type may be determined as a synthetic image.

If the standard deviation of the pixel values of the image corresponding to the changed region is greater than the predetermined reference value, the encoding unit may determine the image type as a natural image. For example, if the standard deviation of the pixel values of an image is greater than the predetermined reference value, this may mean that the image is formed of a greater number of colors. Therefore, if the standard deviation of the pixel values of the image is greater than the predetermined reference value, the encoding unit may determine that the image corresponding to the changed region is a natural image formed of many colors.

In this case, the encoding unit may perform a still image encoding of the changed region by using a still image compression technique selected from PNG (portable network graphics) and JPEG (joint photography experts group) in accordance with the image type.

The PNG still image compression technique may obtain a good quality of an image but may cause an increase in size of data when encoding. Therefore, if the bandwidth of a transmission network is low, a transmission speed may be lowered. The JPEG still image compression technique has a good compression efficiency and thus can considerably reduce the amount of transmission data when encoding but may cause a great system load because of a high compression efficiency when encoding and decoding. Also, the JPEG still image compression technique may be more effective in compressing a natural image in which similar colors gather around one pixel. Therefore, if the image type corresponding to the changed region is a natural image, the encoding unit may encode the changed region through the JPEG still image compression technique.

Additionally, if the changed region is a synthetic image, the JPEG still image compression technique may not reach the expectation of the compression efficiency as much as a natural image. Therefore, in case of a synthetic image, the encoding unit may perform a still image encoding of the changed region by selecting the PNG still image compression technique capable of enhancing the image quality.

Additionally, if the changed region is a synthetic image and has a greater size resulting in great data, the encoding unit may encode the changed region by using the paletted PNG still image compression technique capable of reducing the size of data. The paletted PNG still image compression technique may guarantee a transmission speed because of a reduced data size of an image when encoding but may cause the degradation of an image quality since the color is expressed with 8 bits.

Additionally the cloud streaming service method depending on an image type according to an embodiment of this invention performs a cloud streaming service based on a still image by sending the still-image-encoded changed region to a user (S930). Namely, by transmitting the changed region, compressed through encoding, to a user's terminal device, the user can experience as if an application is being executed at the user's terminal device.

Meanwhile, although not shown in FIG. 9, the cloud streaming service method depending on an image type according to an embodiment of this invention stores various kinds of the above-discussed information created in a cloud streaming service process according to an embodiment of this invention.

Figure 10:
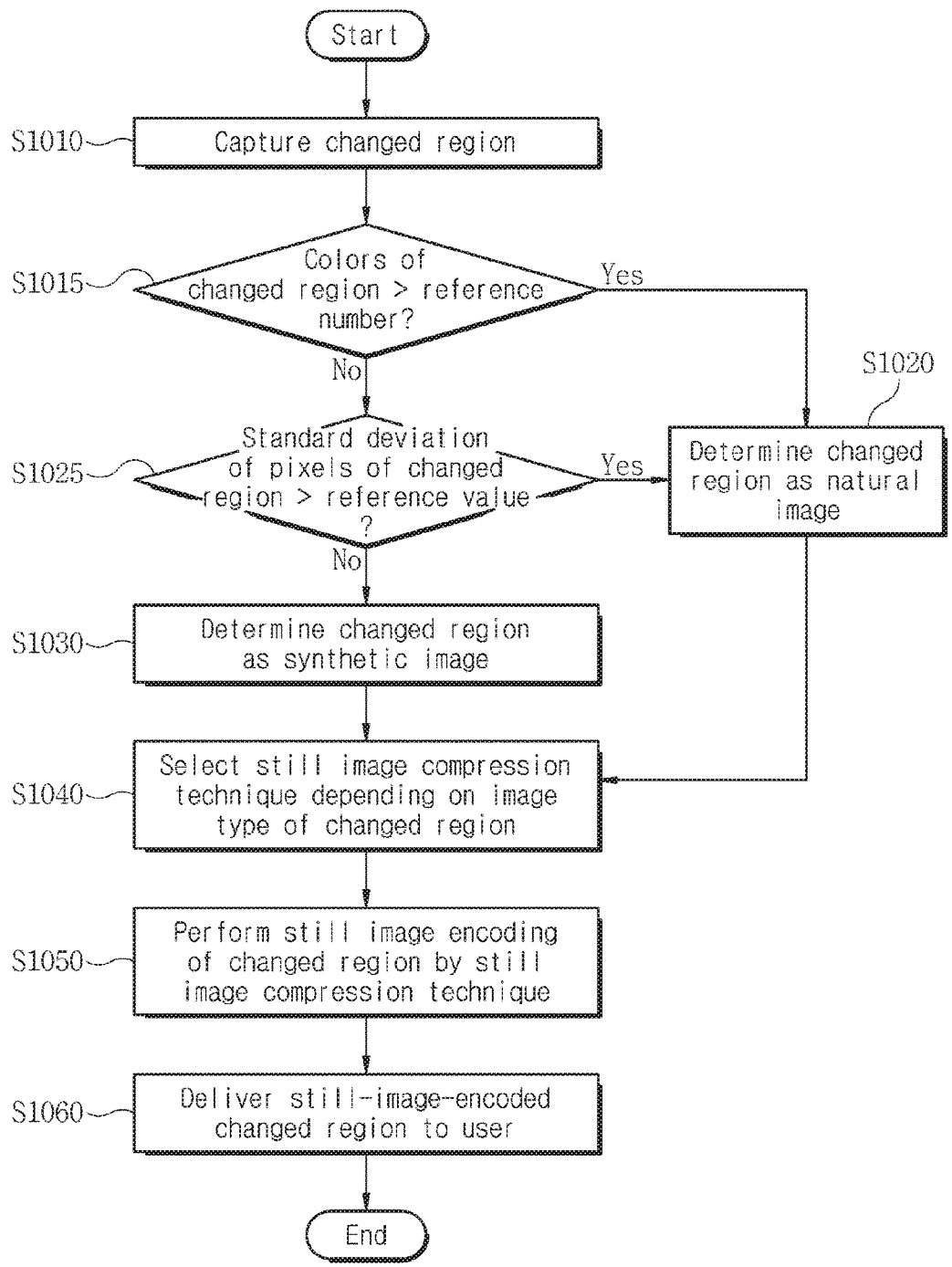
FIG. 10 is a detailed flow diagram illustrating a cloud streaming service method depending on an image type according to an embodiment of the present invention.

FIG. 10 is a detailed flow diagram illustrating a cloud streaming service method depending on an image type according to an embodiment of the present invention.

Referring to FIG. 10, in the cloud streaming service method depending on an image type according to an embodiment of this invention, the cloud streaming server captures a changed region contained in a changed frame in comparison with a previous frame (S1010). In this case, a certain region of a screen area corresponding to the changed frame that is different from a screen area corresponding to the previous frame may be captured as a changed region.

Thereafter, the server determines whether the number of colors of the image corresponding to the changed region is greater than a predetermined reference number (S1015).

If it is determined at step S1015 that the number of colors exceeds the predetermined reference number, the server determines that the image type of the changed region is a natural image (S1020).

If it is determined at step S1015 that the number of colors does not exceed the predetermined reference number, the server determines whether the standard deviation of pixel values of the image corresponding to the changed region is greater than a predetermined reference value (S1025).

If it is determined at step S1025 that the standard deviation exceeds the predetermined reference value, the server determines that the image type of the changed region is a natural image (S1020).

If it is determined at step S1025 that the standard deviation does not exceed the predetermined reference value, the server determines that the image type of the changed region is a synthetic image (S1030).

Thereafter, depending on the determined image type, the cloud streaming server selects a still image compression technique (S1040). At this time, one of PNG (portable network graphics) and JPEG (joint photography experts group) may be selected as still image compression technique. Further, if the image type is a synthetic image, paletted PNG (operable network graphics) still image compression technique may be used.

Thereafter, the cloud streaming server performs a still image encoding of the changed region by using the selected still image compression technique (S1050).

Thereafter, the cloud streaming server delivers the still-image-encoded changed region to a user's terminal device (S1060). By transmitting the changed region, compressed through a still image encoding, to a user's terminal device, the user can experience as if an application is being executed at the user's terminal device.

Figure 11:
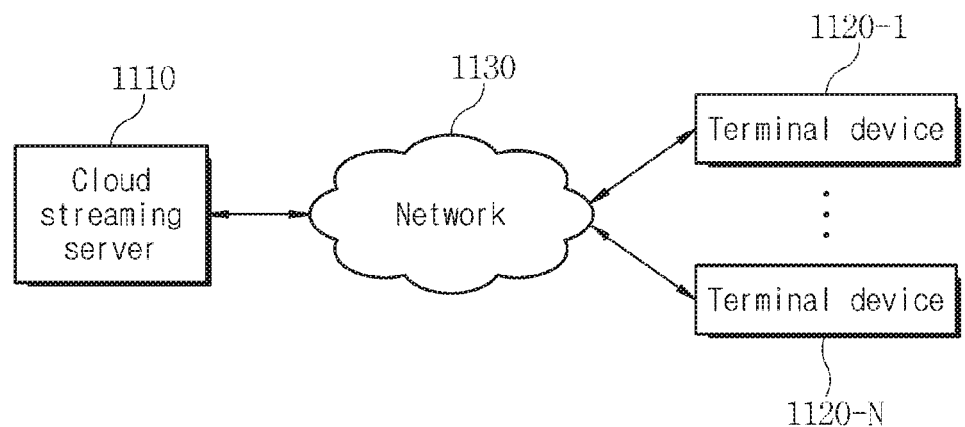
FIG. 11 is a block diagram illustrating a cloud streaming service system according to yet another embodiment of the present invention.

FIG. 11 is a block diagram illustrating a cloud streaming service system according to yet another embodiment of the present invention.

Referring to FIG. 11, the cloud streaming service system according to an embodiment of this invention includes a cloud streaming server 1110, terminal devices 1120-1 to 1120-N, and a network 1130.

The cloud streaming server 1110 executes an application in response to a request for a cloud streaming service from the terminal devices 1120-1 to 1120-N and provides an execution resultant screen corresponding to a result of executing the application to the terminal devices 1120-1 to 1120-N.

The cloud streaming service basically applies a cloud streaming technique based on a video codec. Therefore, even when the cloud streaming technique is applied to a static screen such as a menu display; the cloud streaming service has been performed in an ineffective manner of unnecessarily capturing the entire screen and encoding with the video codec. In order to solve this problem, the present invention provides the cloud streaming service system in which the cloud streaming server detects a changed region between frames in case of a smaller change between frames, such as a menu display screen, and encodes the changed region only through the still image compression technique.

The cloud streaming server 1110 captures a changed region contained in a changed frame in comparison with a previous frame. Namely, compared with a screen corresponding to the previous frame, a different region in a screen corresponding to the changed frame may be captured as the changed region. In this case, the server may detect a section having a smaller frame change in all frames to be transmitted to the terminal devices 1120-1 to 1120-N and then capture the changed region in the detected section. At this time, by identifying an event type of an application occurring at the terminal devices 1120-1 to 1120-N, such a section having a smaller frame change may be detected.

Also, the cloud streaming server 1110 selects a still image compression technique by considering one or more of a load size of the cloud streaming server and a data processing rate of a network, and performs a still image encoding of the changed region corresponding to one frame by using the selected still image compression technique. In this case, using the still image compression technique such as PNG (portable network graphics), paletted PNG (portable network graphics) and PEG (joint photography experts group), the changed region may be compressed. If the load size of the cloud streaming server is smaller than a predetermined reference value, the JPEG still image compression technique may be applied to encode the changed region. If the load size of the cloud streaming server is equal to or greater than the predetermined reference value, a suitable still image compression technique may be selected by considering the data processing rate of the network. If the data processing rate of the network is smaller than a predetermined processing rate, the PNG still image compression technique may be applied to encode the changed region. If the load size of the cloud streaming server is equal to or greater than a predetermined reference value and if the data processing rate of the network is equal to or greater than the predetermined processing rate the palleted PNG still image compression technique may be applied to encode the changed region.

Also, the cloud streaming server 1110 transmits the still-image-encoded changed region to a user, thus performing the cloud streaming service based on a still image.

The terminal devices 1120-1 to 1120-N receive an application execution result screen corresponding to the cloud streaming service from the cloud streaming server 1110 and then provide it to a user.

The terminal devices 1120-1 to 1120-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 1120-1 to 1120-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 1130 offers a route of delivering data between the cloud streaming server 1110 and the terminal devices 1120-1 to 1120-N, including a typically used network and any future developable network. For example, the network 1130 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 1130 is not limited to the existing transmission scheme standard, and may include all transmission scheme standards to be developed in the future. Also, the network used between the cloud streaming server 1110 and the terminal devices 1120-1 to 1120-N in FIG. 1 may be different from or identical with a network between the terminal devices 1120-1 to 1120-N.

Figure 12:
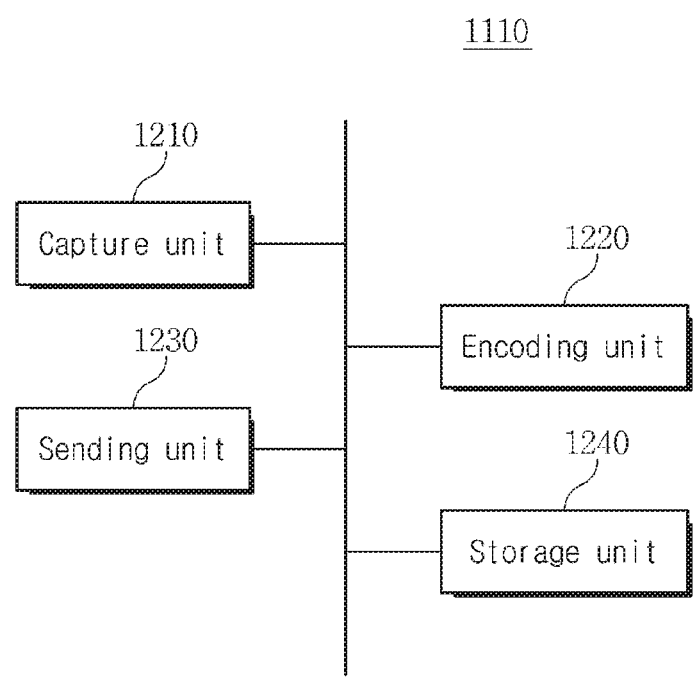
FIG. 12 is a block diagram illustrating an example of the cloud streaming server shown in FIG. 11.

FIG. 12 is a block diagram illustrating an example of the cloud streaming server shown in FIG. 11.

Referring to FIG. 12, the cloud streaming server 1110 shown in FIG. 11 includes a capture unit 1210, an encoding unit 1220, a sending unit 1230, and a storage unit 1240.

The cloud streaming service basically applies cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming server 1110 for detecting a changed region between frames in case of a smaller change between frames, such as a menu display screen, and encoding the changed region only through the still image compression technique.

The capture unit 1210 captures a changed region contained in a changed frame in comparison with a previous frame. The cloud streaming technique based on the video codec may capture and encode all frames corresponding to a screen on which an application is running. However, if there is a smaller change between frames on the screen, the capture unit 1210 may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 1220 selects a still image compression technique by considering one or more of a load size of the cloud streaming server and a data processing rate of a network, and then performs a still image encoding of the changed region corresponding to one frame by using the selected still image compression technique.

The load of the cloud streaming server refers to operations or resources required for actions of the server in order to achieve a certain desired effect. For example, when a still image corresponding to a changed region is encoded or decoded, the load of the cloud streaming server may become larger. The limitation of such a server load may be varied depending on hardware devices that constitute the server. If a command that exceeds the limitation of the server load is inputted, a bottleneck that causes the degradation of server performance may occur. Therefore, in the cloud streaming service, the server may select a still image compression technique having a smaller load by considering the size of the server load.

Additionally, the data processing rate of the network refers to a rate at which data is processed on the basis of the same network bandwidth. The data processing rate of the network may also be the reason of a bottleneck that occurs when data processing exceeding the network bandwidth is required. Therefore, in the cloud streaming service, the server may identify the data processing rate of the network and select a still image compression technique capable of reducing the size of data.

In this case, using the still image compression technique such as PNG (portable network graphics), paletted PNG (portable network graphics), and JPEG (joint photography experts group), the changed region may be compressed. The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The JPEG still image compression technique has a good compression efficiency and thus can considerably reduce the amount of transmission data when encoding but may cause a great system load because of a high compression efficiency when encoding and decoding.

If the load size of the cloud streaming server is smaller than a predetermined reference value, the encoding unit may encode the changed region by applying the JPEG still image compression technique. Because of having a higher compression rate in comparison with the PNG still image compression technique and the paletted still image compression technique, the JPEG still image compression technique may cause a great load when the server performs encoding or when the client performs decoding. Therefore, if the load size of the cloud streaming server is small, the changed region may be encoded through the JPEG still image compression technique. Meanwhile, because of having a higher compression rate, the JPEG still image compression technique may reduce the size of data and prevent an increase in the amount of data processing when the network has a greater amount of data processing.

If the load size of the cloud streaming server is equal to or greater than the predetermined reference value, the encoding unit may select the still image compression technique by considering the data processing rate of the network. For example, if the load size of the cloud streaming server is equal to or greater than the predetermined reference value, the encoding unit may encode the changed region by selecting the still image compression technique from the PNG still image compression technique and the paletted PNG still image compression technique. In this case, depending on the still image compression technique selected from the PNG still image compression technique and the paletted PNG still image compression technique, the size of transmission data may become different. Therefore, by considering the data processing rate of the network, the still image compression technique may be selected.

If the data processing rate of the network is smaller than the predetermined processing rate, the encoding unit may encode the changed region by applying the PNG still image compression technique. For example, in case of encoding the changed region through the PNG still image compression technique, the image quality of the changed region offered to the user's terminal device may be good, but the size of data may be increased. Namely, if the bandwidth of the network is low, a service speed may be lowered. Therefore, if the data processing rate of the network is low and thus the network is smooth, the PNG still image compression technique capable of enhancing the image quality may be suitable for encoding the changed region. Also, because the PNG still image compression technique has a smaller load at encoding and decoding, the encoding unit may prevent an increase of a server load by encoding the changed region through the PNG still image compression technique when the cloud streaming server has a greater load.

If the load size of the cloud streaming server is equal to or greater than the predetermined reference value and if the data processing rate of the network is equal to or greater than the predetermined processing rate, the encoding unit may encode the changed region by applying the paletted PNG still image compression technique. For example, when the changed region is encoded through the paletted PNG still image compression technique, the image quality may be degraded, but the size of transmission data may be reduced. Therefore, if there is a possibility of a bottleneck due to a higher data processing rate of the network, the encoding unit may prevent an increase of the amount of data transmission by encoding the changed region through the paletted PNG still image compressing technique capable of reducing the size of data.

Additionally, the order of considering the load size of the cloud streaming server and the data processing rate of the network so as to determine the still image compression technique for encoding the changed region may be determined differently depending on the cloud streaming service.

The sending unit 1230 performs a cloud streaming service based on a still image by sending the still-image-encoded changed region to a user Namely, by transmitting the changed region, compressed through encoding, to a user's terminal device, the user can experience as if an application is being executed at the user's terminal device.

The storage unit 1240 stores various kinds of the above-discussed information created in a cloud streaming service process according to an embodiment of this invention.

According to an embodiment, the storage unit 1240 may be formed independently from the cloud streaming service 1110 and support a function for the cloud streaming service. In this case, the storage unit 1240 may operate as separate high-capacity storage and include a control function for the operation.

In addition, the above-discussed cloud streaming server 1110 may be also implemented by means of one or more servers.

Meanwhile, the cloud streaming server 1110 has a memory that may store information. In an embodiment, the memory is a computer-readable medium. The memory may be a volatile memory unit in one embodiment and a non-volatile memory unit in another embodiment. In an embodiment, the storage unit is a computer-readable medium. In various different embodiments, the storage unit may include a hard disk device, an optical disk device, or any other high-capacity storage device.

Figure 13:
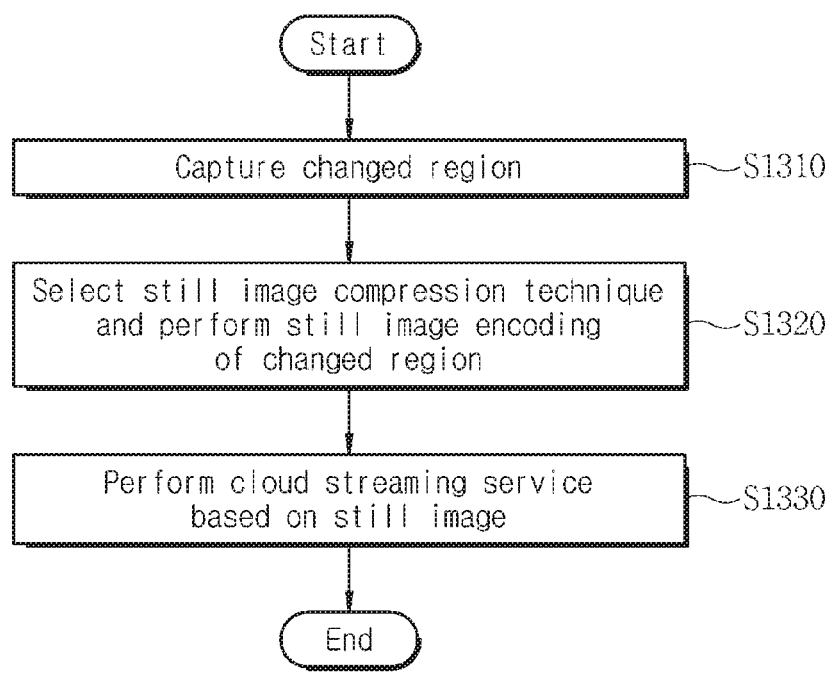
FIG. 13 is a flow diagram illustrating a cloud streaming service method based on a still image according to another embodiment of the present invention.

FIG. 13 is a flow diagram illustrating a cloud streaming service method based on a still image according to another embodiment of the present invention.

Referring to FIG. 13, the cloud streaming service method based on a still image according to an embodiment of this invention captures a changed region contained in a changed frame in comparison with a previous frame (S1310). A cloud streaming technique based on a video codec may performing encoding by capturing all frames corresponding to a screen on which an application is running. However, when a change between frames is small on the screen where the application is running, it is possible to perform a still image encoding by capturing only a changed region of a changed frame in comparison with a previous frame such that a user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally the cloud streaming service method based on a still image according to an embodiment of this invention selects a still image compression technique by considering one or more of a load size of the cloud streaming server and a data processing rate of a network, and then performs a still image encoding of the changed region corresponding to one frame by using the selected still image compression technique (S1320).

The load of the cloud streaming server refers to operations or resources required for actions of the server in order to achieve a certain desired effect. For example, when a still image corresponding to a changed region is encoded or decoded, the load of the cloud streaming server may become larger. The limitation of such a server load may be varied depending on hardware devices that constitute the server. If a command that exceeds the limitation of the server load is inputted, a bottleneck that causes the degradation of server performance may occur. Therefore, in the cloud streaming service, the server may select a still image compression technique having a smaller load by considering the size of the server load.

Additionally, the data processing rate of the network refers to a rate at which data is processed on the basis of the same network bandwidth. The data processing rate of the network may also be the reason of a bottleneck that occurs when data processing exceeding the network bandwidth is required. Therefore, in the cloud streaming service, the server may identify the data processing rate of the network and select a still image compression technique capable of reducing the size of data.

In this case, using the still image compression technique such as PNG (portable network graphics), paletted PNG (portable network graphics), and JPEG (joint photography experts group), the changed region may be compressed. The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The JPEG still image compression technique has a good compression efficiency and thus can considerably reduce the amount of transmission data when encoding but may cause a great system load because of a high compression efficiency when encoding and decoding.

If the load size of the cloud streaming server is smaller than a predetermined reference value, the encoding unit may encode the changed region by applying the JPEG still image compression technique. Because of having a higher compression rate in comparison with the PNG still image compression technique and the paletted still image compression technique, the JPEG still image compression technique may cause a great load when the server performs encoding or when the client performs decoding. Therefore, if the load size of the cloud streaming server is small, the changed region may be encoded through the JPEG still image compression technique. Meanwhile, because of having a higher compression rate, the JPEG still image compression technique may reduce the size of data and prevent an increase in the amount of data processing when the network has a greater amount of data processing.

If the load size of the cloud streaming server is equal to or greater than the predetermined reference value, the encoding unit may select the still image compression technique by considering the data processing rate of the network. For example, if the load size of the cloud streaming server is equal to or greater than the predetermined reference value, the encoding unit may encode the changed region by selecting the still image compression technique from the PNG still image compression technique and the paletted PNG still image compression technique. In this case, depending on the still image compression technique selected from the PNG still image compression technique and the paletted PNG still image compression technique, the size of transmission data may become different. Therefore, by considering the data processing rate of the network, the still image compression technique may be selected.

If the data processing rate of the network is smaller than the predetermined processing rate, the encoding unit may encode the changed region by applying the PNG still image compression technique. For example, in case of encoding the changed region through the PNG still image compression technique, the image quality of the changed region offered to the user's terminal device may be good, but the size of data may be increased. Namely, if the bandwidth of the network is low, a service speed may be lowered. Therefore, if the data processing rate of the network is low and thus the network is smooth, the PNG still image compression technique capable of enhancing the image quality may be suitable for encoding the changed region. Also, because the PNG still image compression technique has a smaller load at encoding and decoding, the encoding unit may prevent an increase of a server load by encoding the changed region through the PNG still image compression technique when the cloud streaming server has a greater load.

If the load size of the cloud streaming server is equal to or greater than the predetermined reference value and if the data processing rate of the network is equal to or greater than the predetermined processing rate, the encoding unit may encode the changed region by applying the paletted PNG still image compression technique. For example, when the changed region is encoded through the paletted PNG still image compression technique, the image quality may be degraded, but the size of transmission data may be reduced. Therefore, if there is a possibility of a bottleneck due to a higher data processing rate of the network, the encoding unit may prevent an increase of the amount of data transmission by encoding the changed region through the paletted PNG still image compressing technique capable of reducing the size of data.

Additionally, the order of considering the load size of the cloud streaming server and the data processing rate of the network so as to determine the still image compression technique for encoding the changed region may be determined differently depending on the cloud streaming service.

Additionally the cloud streaming service method based on a still image according to an embodiment of this invention performs a cloud streaming service based on a still image by sending the still-image-encoded changed region to a user (S1330). Namely, by transmitting the changed region, compressed through encoding, to a user's terminal device, the user can experience as if an application is being executed at the user's terminal device.

Figure 14:
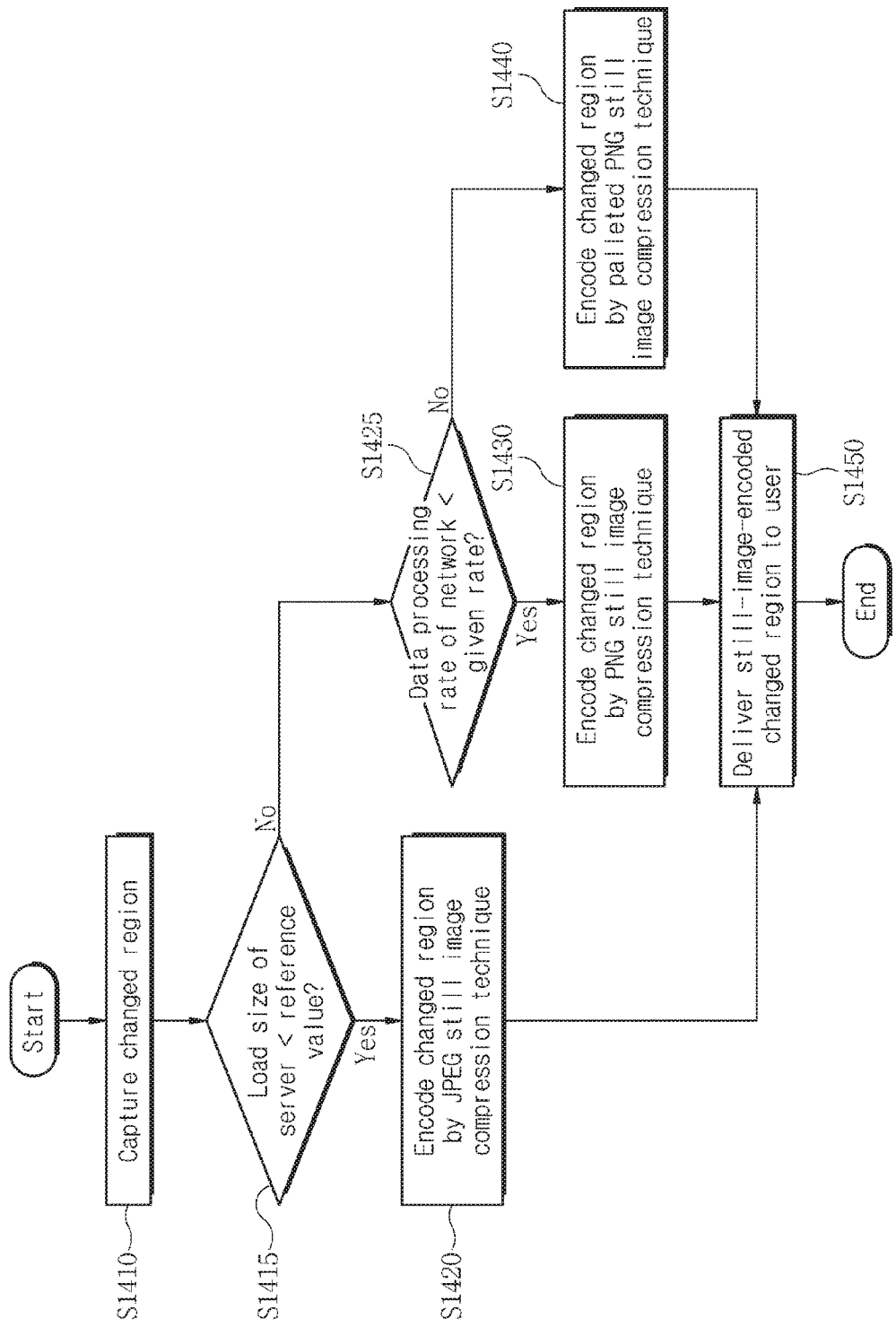
FIG. 14 is a detailed flow diagram illustrating a cloud streaming service method based on a still image according to another embodiment of the present invention.

FIG. 14 is a detailed flow diagram illustrating a cloud streaming service method based on a still image according to another embodiment of the present invention.

Referring to FIG. 14, in the cloud streaming service method based on a still image according to an embodiment of this invention, a cloud streaming server captures a changed region contained in a changed frame in comparison with a previous frame (S1410). In this case, a certain region of a screen area corresponding to the changed frame that is different from a screen area corresponding to the previous frame may be captured as a changed region. In this case, a section having a smaller frame change may be detected in all frames to be transmitted to the user's terminal device, and the changed region may be captured in the detected section. At this time, by identifying an event type of an application occurring from the user's terminal device, such a section having a smaller frame change may be detected.

The cloud streaming server determines whether the load size of the cloud streaming server is smaller than a predetermined reference value (S1415).

If it is determined at step S1415 that the load size of the cloud streaming server is smaller than the predetermined reference value, the server encodes the changed region through the JPEG still image compression technique (S1420). Because of having a higher compression rate in comparison with the PNG still image compression technique and the paletted still image compression technique, the JPEG still image compression technique may cause a great load when the server performs encoding or when the client performs decoding. Therefore, if the load size of the cloud streaming server is small, the changed region may be encoded through the JPEG still image compression technique.

If it is determined at step S1415 that the load size of the cloud streaming server is equal to or greater than the predetermined reference value, the server determines whether the data processing rate of the network is smaller than a predetermined processing rate (S1425).

If it is determined at step S1425 that the data processing rate of the network is smaller than the predetermined processing rate, the server encodes the changed region through the PNG still image compression technique (S1430). In case of encoding the changed region through the PNG still image compression technique, the image quality of the changed region offered to the user's terminal device may be good, but the size of data may be increased. Namely, if the bandwidth of the network is low, a service speed may be lowered. Therefore, if the data processing rate of the network is low and thus the network is smooth, the PNG still image compression technique capable of enhancing the image quality may be suitable for encoding the changed region.

If it is determined at step S1425 that the data processing rate of the network is equal to or greater than the predetermined processing rate, the server encodes the changed region through the paletted. PNG still image compression technique (S1440). When the changed region is encoded through the paletted PNG still image compression technique, the image quality may be degraded, but the size of transmission data may be reduced. Therefore, if there is a possibility of a bottleneck due to a higher data processing rate of the network, the encoding unit may prevent an increase of the amount of data transmission by encoding the changed region through the paletted PNG still image compressing technique capable of reducing the size of data.

Thereafter, the cloud streaming server delivers the still-image-encoded changed region to a user (S1450). By transmitting the changed region, compressed through a still image encoding, to a user's terminal device, the user can experience as if an application is being executed at the user's terminal device.

The computer-readable storage medium, having recorded thereon, suitable for storing computer program command languages and data, includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of this invention, and vice versa.

While this disclosure contains many specific implementation details, these should not be construed as limitations on the scope of the invention or of what may be claimed, but rather as descriptions of features that may be specific to particular embodiments of particular invention. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While the present invention has been particularly shown and described with reference to an exemplary embodiment thereof, it will be understood by those skilled in the art that various changes in form and details may be made therein without departing from the spirit and scope of the invention as defined by the appended claims.

INDUSTRIAL APPLICABILITY

The present invention may capture a changed region contained in a changed frame in comparison with a previous frame, select a still image compression technique by considering one or more of a size of the changed region and an image type corresponding to the changed region, perform a still image encoding of the changed region corresponding to one frame by using the selected still image compression technique, and perform a cloud streaming service based on a still image by sending the still-image-encoded changed region to a user. Further, this invention may maximize the streaming compression efficiency through a cloud streaming service based on a still image and also provide a faster cloud streaming service to more users over the same band. Therefore, the cloud streaming service provider can provide an efficient service to users while saving resources needed for band expansion.

Additionally, the present invention may capture a changed region contained in a changed frame in comparison with a previous frame, select a still image compression technique in accordance with an image type determined by considering one or more of the number of colors of an image corresponding to the changed region and a standard deviation of pixel values of the image, perform a still image encoding of the changed region corresponding to one frame by using the selected still image compression technique, and perform a cloud streaming service based on a still image by sending the still-image-encoded changed region to a user. Further, this invention may maximize the streaming compression efficiency through a cloud streaming service depending on an image type and also provide a faster cloud streaming service to more users over the same band. Therefore, the cloud streaming service provider can provide an efficient service to users while saving resources needed for band expansion.

Additionally, the present invention may capture a changed region contained in a changed frame in comparison with a previous frame, select a still image compression technique by considering one or more of a load size of the cloud streaming server and a data processing rate of a network, perform a still image encoding of the changed region corresponding to one frame by using the selected still image compression technique, and perform a cloud streaming service based on a still image by sending the still-image-encoded changed region to a user. Further, this invention may maximize the streaming compression efficiency through a cloud streaming service based on a still image and also provide a faster cloud streaming service to more users over the same hand. Therefore, the cloud streaming service provider can provide an efficient service to users while saving resources needed for band expansion.

What is claimed is:

1. A cloud streaming server comprising: a memory; and a processor configured to execute instructions stored in the memory and to:
capture a changed region contained in a changed frame in comparison with a previous frame, wherein:
the changed region comprises a specific region changed in a screen area corresponding to the changed frame in comparison with a screen area corresponding to the previous frame; and
the changed region can be determined by at least one or more of data size, image type, number of colors, and pixel values, corresponding to the changed region;
select a still image compression technique based on one or more of a size of data of the changed region and an image type corresponding to the changed region;
perform a still image encoding of the changed region corresponding to one frame by using the selected still image compression technique; and
perform a cloud streaming service based on a still image by sending the still-image-encoded changed region to a user,
wherein the processor is configured to select the still image compression technique primarily based on the size of the data of the changed region when the size of the data of the changed region is equal to or greater than a predetermined reference value and secondly based on the image type, and
wherein the processor is further configured, if the image type is a mixed image of a natural image and a synthetic image, to select the still image compression technique in accordance with the image type corresponding to a larger part in the changed region by comparing a part corresponding to the natural image with another part corresponding to the synthetic image.

2. The cloud streaming server of claim 1, wherein the processor is further configured to compress the changed region by using one of still image compression techniques including PNG (portable network graphics), palleted PNG (portable network graphics), and JPEG (joint photography experts group).

3. The cloud streaming server of claim 2, wherein the processor is further configured, if the size of the data of the changed region is smaller than a predetermined reference value, to encode the changed region by applying the PNG still image compression technique.

4. The cloud streaming server of claim 2, wherein the processor is further configured, if the image type is the natural image, to encode the changed region by applying the JPEG still image compression technique.

5. The cloud streaming server of claim 2, wherein the processor is further configured, if the size of the data of the changed region is equal to or greater than a predetermined reference value, and if the image type is the synthetic image, to encode the changed region by applying the palette PNG still image compression technique.

6. The cloud streaming server of claim 1, wherein the processor is further configured to detect a section having a smaller frame change in all frames to be transmitted to a terminal device of the user, and to capture the changed region in the detected section.

7. The cloud streaming server of claim 6, wherein the processor is further configured to detect the section having a smaller frame change by sensing an event type of an application occurring at the terminal device of the user.

8. A cloud streaming server comprising:
a memory; and
a processor configured to execute instructions stored in the memory and to:
capture a changed region contained in a changed frame in comparison with a previous frame, wherein:
the changed region comprises a specific region changed in a screen area corresponding to the changed frame in comparison with a screen area corresponding to the previous frame; and
the changed region can be determined by at least one or more of data size, image type, number of colors, and pixel values, corresponding to the changed region;
select a still image compression technique based on an image type determined by considering one or more of the number of colors of an image corresponding to the changed region and a standard deviation of pixel values of the image;
perform a still image encoding of the changed region corresponding to one frame by using the selected still image compression technique; and
perform a cloud streaming service based on a still image by sending the still-image-encoded changed region to a user,
wherein the processor is further configured, considering the number of colors of the image corresponding to the changed region primarily, if the number of colors of the image corresponding to the changed region is equal to or smaller than a predetermined reference number, to determine the image type by considering the standard deviation of the pixel values of the image corresponding to the changed region secondly, and
wherein the processor is further configured, if the number of colors of the image corresponding to the changed region is equal to or smaller than the predetermined reference number, and if the standard deviation of the pixel values of the image corresponding to the changed region is equal to or smaller than a predetermined reference value, to determine the image type as a synthetic image.

9. The cloud streaming server of claim 8, wherein the processor is further configured to select the still image compression technique based on one of image types including a natural image and the synthetic image.

10. The cloud streaming server of claim 9, wherein the processor is further configured, if the number of colors of the image corresponding to the changed region is greater than a predetermined reference number, to determine the image type as the natural image.

11. A cloud streaming server comprising:
a memory; and
a processor configured to execute instructions stored in the memory and to:
capture a changed region contained in a changed frame in comparison with a previous frame, wherein:
the changed region comprises a specific region changed in a screen area corresponding to the changed frame in comparison with a screen area corresponding to the previous frame; and
the changed region can be determined by at least one or more of data size, image type, number of colors, and pixel values, corresponding to the changed region;
select a still image compression technique by considering one or more of a load size of the cloud streaming server and a data processing rate of a network;
perform a still image encoding of the changed region corresponding to one frame by using the selected still image compression technique; and
perform a cloud streaming service based on a still image by sending the still-image-encoded changed region to a user,
wherein the processor is further configured, considering the load size of the cloud streaming server primarily, if the load size of the cloud streaming server is equal to or greater than the predetermined reference value, to select the still image compression technique by considering the data processing rate of the network secondly,
wherein the processor is further configured to encode the changed region by applying PNG (portable network graphics) still image compression technique if the data processing rate of the network is smaller than a predetermined processing rate, and to encode the changed region by applying palette PNG still image compression technique if the load size of the cloud streaming server is equal to or greater than a predetermined reference value and if the data processing rate is equal to or greater than the predetermined processing rate.

12. The cloud streaming server of claim 11, wherein the processor is further configured to compress the changed region by using one of still image compression techniques including the PNG, the palleted PNG, and JPEG (joint photography experts group).

13. The cloud streaming server of claim 12, wherein the processor is further configured, if the load size of the cloud streaming server is smaller than a predetermined reference value, to encode the changed region by applying the JPEG still image compression technique.

* * * * *